US012260336B2

(12) United States Patent
Asad et al.

(10) Patent No.: US 12,260,336 B2
(45) Date of Patent: Mar. 25, 2025

(54) TRAINING A NEURAL NETWORK

(71) Applicant: Imagination Technologies Limited, Kings Langley (GB)

(72) Inventors: Muhammad Asad, Hertfordshire (GB); Elia Condorelli, Hertfordshire (GB); Cagatay Dikici, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 403 days.

(21) Appl. No.: 17/559,331

(22) Filed: Dec. 22, 2021

(65) Prior Publication Data
US 2022/0261652 A1 Aug. 18, 2022

(30) Foreign Application Priority Data

Dec. 22, 2020 (GB) .................................... 2020386

(51) Int. Cl.
G06N 3/084 (2023.01)
G06F 18/2136 (2023.01)
G06N 3/082 (2023.01)

(52) U.S. Cl.
CPC ......... *G06N 3/084* (2013.01); *G06F 18/2136* (2023.01); *G06N 3/082* (2013.01)

(58) Field of Classification Search
CPC ........ G06N 3/084; G06N 3/082; G06N 3/045; G06N 3/063; G06N 3/0495; G06F 18/2136
See application file for complete search history.

(56) References Cited

U.S. PATENT DOCUMENTS

2017/0076224 A1\* 3/2017 Munawar ............... G06N 3/045
2017/0109881 A1\* 4/2017 Avendi ................. G06V 10/764
(Continued)

FOREIGN PATENT DOCUMENTS

EP 4020324 A1 6/2022
EP 4020325 A1 6/2022
(Continued)

OTHER PUBLICATIONS

Liu et al; "Learning Efficient Convolutional Networks through Network Slimming"; arXiv:1708.06519v1 [cs.CV] Aug. 22, 2017; pp. 1-10.
(Continued)

*Primary Examiner* — Chan S Park
*Assistant Examiner* — D J Dhooge
(74) *Attorney, Agent, or Firm* — Potomac Law Group, PLLC; Vincent M DeLuca

(57) ABSTRACT

A computer implemented method of training a neural network configured to combine a set of coefficients with respective input data values. So as to train a test implementation of the neural network, sparsity is applied to one or more of the coefficients according to a sparsity parameter, the sparsity parameter indicating a level of sparsity to be applied to the set of coefficients; the test implementation of the neural network is operated on training input data using the coefficients so as to form training output data; in dependence on the training output data, assessing the accuracy of the neural network; the sparsity parameter is updated in dependence on the accuracy of the neural network; and a runtime implementation of the neural network is configured in dependence on the updated sparsity parameter.

20 Claims, 13 Drawing Sheets

(56) References Cited

U.S. PATENT DOCUMENTS

| | | | |
|---|---|---|---|
| 2018/0137417 A1* | 5/2018 | Theodorakopoulos | G06N 3/04 |
| 2018/0181864 A1* | 6/2018 | Mathew | G06N 3/084 |
| 2019/0147326 A1 | 5/2019 | Martin | |
| 2020/0097830 A1 | 3/2020 | Deng | |

FOREIGN PATENT DOCUMENTS

| | | | | |
|---|---|---|---|---|
| GB | 2579399 A | 6/2020 | | |
| WO | 2018/022821 A1 | 2/2018 | | |
| WO | WO-2019157228 A1 * | 8/2019 | | G06N 20/00 |
| WO | WO-2020014590 A1 * | 1/2020 | | G06F 17/16 |
| WO | 2020131968 A1 | 6/2020 | | |

OTHER PUBLICATIONS

Herrmann et al, "Channel selection using Gumbel Softmax", 2020, available from https://arxiv.org/pdf/1812.04180.pdf.

Jang et al, "Categorical Reparametrization with Gumbel-Softmax", 2017, available from https://arxiv.org/pdf/1611.01144.pdf.

Retsinas et al, "Weight Pruning via Adaptive Sparsity Loss," Cornell University Library, 2020, sections 3.4, 3.4.1.

Umair Haider et al, "Comprehensive Online Network Pruning via Learnable Scaling Factors," Cornell University Library, 2020, sections 3.1-3.4.

Luo et al., "ThiNet: A Filter Level Pruning Method for Deep Neural Network Compression," 2017 IEEE Int'l Conference on Computer Vision, IEEE Computer Society 2017, pp. 5068-5076.

Singh et al., "Multi-layer Pruning Framework for Compressing Single Shot MultiBox Detector," 2019 IEEE Winter Conference on Applications of Computer Vision, 2019, pp. 1318-1327.

Wang et al; "Stochastic Ordering of Extreme Value Distributions"; IEEE Transactions on Systems, Man and Cybernetics—Part A: Systems and Humans; vol. 29; No. 6; Nov. 1999; pp. 696-701.

\* cited by examiner

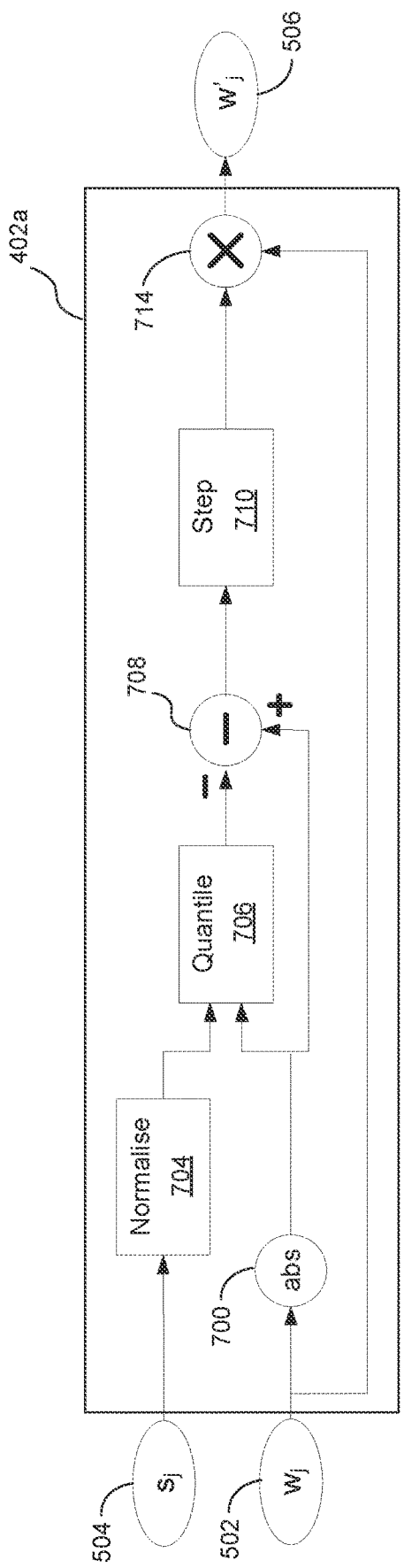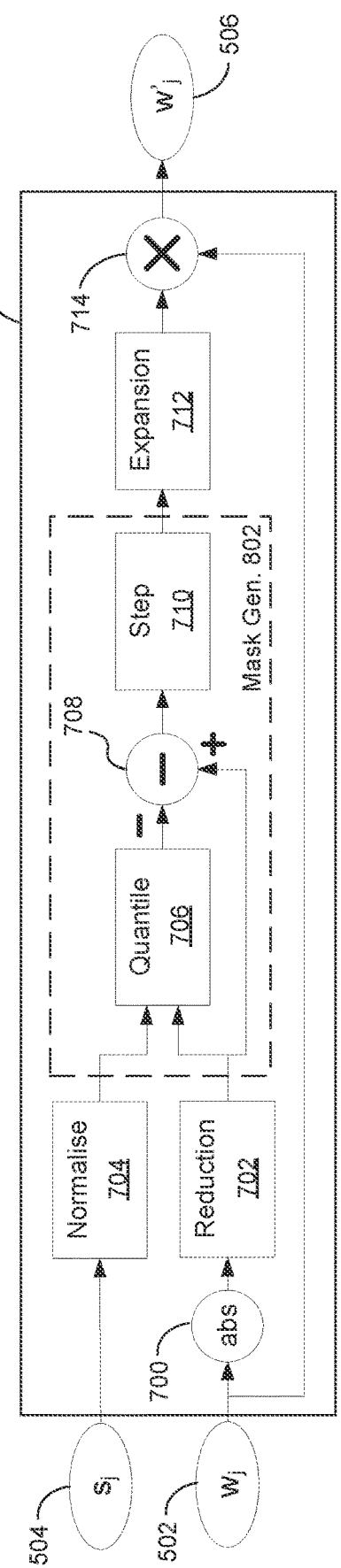
FIGURE 7a
FIGURE 7b

TRAINING A NEURAL NETWORK

BACKGROUND

The present disclosure relates to computer implemented neural networks. In particular, the present disclosure relates to the application of sparsity in computer implemented neural networks.

Neural networks can be used for machine learning applications. In particular, a neural network can be used in signal processing applications, including image processing and computer vision applications. For example, convolutional neural networks (CNNs) are a class of neural network that are often applied to analysing image data, e.g. for image classification applications, semantic image segmentation applications, super-resolution applications, object detection applications, etc.

In image classification applications, image data representing one or more images may be input to the neural network, and the output of that neural network may be data indicative of a probability (or set of probabilities) that each of those images belongs to a particular classification (or set of classifications). Neural networks typically comprise multiple layers between input and output layers. In a layer, a set of coefficients may be combined with data input to that layer. Convolutional layers and fully-connected layers are examples of neural network layers in which sets of coefficients are combined with data input to those layers. Neural networks can also comprise other types of layers that are not configured to combine sets of coefficients with data input to those layers, such as activation layers and element-wise layers. In image classification applications, the computations performed in the layers enable characteristic features of the input data to be identified and predictions to be made as to which classification (or set of classifications) that input data belongs to.

Neural networks are typically trained to improve the accuracy of their outputs by using training data. In image classification examples, the training data may comprise data representing one or more images and respective predetermined labels for each of those images. Training a neural network may comprise operating the neural network on the training input data using untrained or partially-trained sets of coefficients so as to form training output data. The accuracy of the training output data can be assessed, e.g. using a loss function. The sets of coefficients can be updated in dependence on the accuracy of the training output data through the processes called gradient descent and back-propagation. For example, the sets of coefficients can be updated in dependence on the loss of the training output data determined using a loss function.

The sets of coefficients used within a typical neural network can be highly parameterised. That is, the sets of coefficients used within a typical neural network often comprise large numbers of non-zero coefficients. Highly parameterised sets of coefficients can have large memory footprints. The memory bandwidth required to read highly parameterised sets of coefficients in from memory can be large. Highly parameterised sets of coefficients can also place a large computational demand on a neural network—e.g. by requiring that the neural network perform a large number of computations (e.g. multiplications) between coefficients and input values. As such, it can be difficult to implement neural networks on devices with limited processing or memory resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the invention there is provided a method of compressing a set of coefficients for subsequent use in a neural network, the method comprising: applying sparsity to a plurality of groups of the coefficients, each group comprising a predefined plurality of coefficients; and compressing the groups of coefficients according to a compression scheme aligned with the groups of coefficients so as to represent each group of coefficients by an integer number of one or more compressed values.

Each group may comprise one or more subsets of coefficients of the set of coefficients, each group may comprises n coefficients and each subset may comprise m coefficients, where m is greater than 1 and n is an integer multiple of m, and the method may further comprise: compressing the groups of coefficients according to the compression scheme by compressing the one or more subsets of coefficients comprised by each group so as to represent each subset of coefficients by an integer number of one or more compressed values.

n may be greater than m, and each group of coefficients may be compressed by compressing multiple adjacent or interleaved subsets of coefficients.

n may be equal to 2m.

Each group may comprise 16 coefficients and each subset may comprise 8 coefficients, and each group may be compressed by compressing two adjacent or interleaved subsets of coefficients.

n may be equal to m.

Applying sparsity to a group of coefficients may comprise setting each of the coefficients in that group to zero.

Sparsity may be applied to the plurality of groups of the coefficients in dependence on a sparsity mask that defines which coefficients of the set of coefficients to which sparsity is to be applied.

The set of coefficients may be a tensor of coefficients, the sparsity mask may be a binary tensor of the same dimensions as the tensor of coefficients, and sparsity may be applied by performing an element-wise multiplication of the tensor of coefficients with the sparsity mask tensor. A binary tensor may be tensor consisting of binary 1s and/or 0s.

The sparsity mask tensor may be formed by: generating a reduced tensor having one or more dimensions an integer multiple smaller than the tensor of coefficients, wherein the integer being greater than 1; determining elements of the reduced tensor to which sparsity is to be applied so as to generate a reduced sparsity mask tensor; and expanding the reduced sparsity mask tensor so as to generate a sparsity mask tensor of the same dimensions as the tensor of coefficients.

Generating the reduced tensor may comprise: dividing the tensor of coefficients into multiple groups of coefficients, such that each coefficient of the set is allocated to only one group and all of the coefficients are allocated to a group and representing each group of coefficients of the tensor of coefficients by the maximum coefficient value within that group.

The method may further comprise expanding the reduced sparsity mask tensor by performing nearest neighbour upsampling such that each value in the reduced sparsity mask tensor is represented by a group comprising a plurality of like values in the sparsity mask tensor.

Compressing each subset of coefficients may comprise: generating header data comprising h-bits and a plurality of body portions each comprising b-bits, wherein each of the body portions corresponds to a coefficient in the subset, wherein b is fixed within a subset, and wherein the header data for a subset comprises an indication of b for the body portions of that subset.

The method may further comprise: identifying a body portion size, b, by locating a bit position of a most significant leading one across all the coefficients in the subset; generating the header data comprising a bit sequence encoding the body portion size; and generating a body portion comprising b-bits for each of the coefficients in the subset by removing none, one or more leading zeros from each coefficient.

The number of groups to which sparsity is to be applied may be determined in dependence on a sparsity parameter.

The method may further comprise: dividing the set of coefficients into multiple groups of coefficients, such that each coefficient of the set is allocated to only one group and all of the coefficients are allocated to a group, determining a saliency of each group of coefficients; and applying sparsity to the plurality of the groups of coefficients having a saliency below a threshold value, the threshold value being determined in dependence on the sparsity parameter.

The threshold value may be a maximum absolute coefficient value or an average absolute coefficient value.

The method may further comprise storing the compressed groups of coefficients to memory for subsequent use in a neural network.

The method may further comprise using the compressed groups of coefficients in a neural network.

According to a second aspect of the invention there is provided a data processing system for compressing a set of coefficients for subsequent use in a neural network, the data processing system comprising: pruner logic configured to apply sparsity to a plurality of groups of the coefficients, each group comprising a predefined plurality of coefficients; and a compression engine configured to compress the groups of coefficients according to a compression scheme aligned with the groups of coefficients so as to represent each group of coefficients by an integer number of one or more compressed values.

According to a third aspect of the invention there is provided a computer implemented method of training a neural network comprising a plurality of layers, each layer being configured to combine a respective set of filters with data input to the layer so as to form output data for the layer, wherein each set of filters comprises a plurality of coefficient channels, each coefficient channel of the set of filters corresponding to a respective data channel in the data input to the layer, and the output data comprises a plurality of data channels, each data channel corresponding to a respective filter of the set of filters, the method comprising: identifying a target coefficient channel of the set of filters of a layer; identifying a target data channel of the plurality of data channels in the data input to the layer, the target data channel corresponding to the target coefficient channel of the set of filters; and configuring a runtime implementation of the neural network in which the set of filters of the preceding layer do not comprise that filter which corresponds to the target data channel.

The data input to the layer may depend on the output data for the preceding layer.

The method may further comprise configuring the runtime implementation of the neural network in which the set of filters of the preceding layer do not comprise that filter which corresponds to the target data channel such that, when executing the runtime implementation of the neural network on the data processing system, combining that set of filters of the preceding layer with data input to the preceding layer does not form the data channel in the output data for the preceding layer corresponding to the target data channel.

The method may further comprise configuring the runtime implementation of the neural network in which each filter of the set of filters of the layer does not comprise the target coefficient channel.

The method may further comprise executing the runtime implementation of the neural network on a data processing system.

The method may further comprise storing the set of filters of the preceding layer that do not comprise that filter which corresponds to the target data channel in memory for subsequent use by the runtime implementation of the neural network.

The set of filters for the layer may comprise a set of coefficients arranged such that each filter of the set of filters comprises a plurality of coefficients of the set of coefficients.

Each filter in the set of filters of the layer may comprise a different plurality of coefficients.

Two or more of the filters in the set of filters of the layer may comprise the same plurality of coefficients.

The method may further comprise identifying a target coefficient channel according to a sparsity parameter, the sparsity parameter indicating a level of sparsity to be applied to the set of filters of the layer.

The sparsity parameter may indicate a percentage of the set of coefficients that are to be set to zero.

Identifying a target coefficient channel may comprise applying a sparsity algorithm so as to set all of the coefficients comprised by a coefficient channel of the set of filters of the layer to zero, and identifying that coefficient channel as the target coefficient channel of the set of filters.

The method may further comprise, prior to identifying a target coefficient channel: operating a test implementation of the neural network on training input data using the set of filters for the layer so as to form training output data; in dependence on the training output data, assessing the accuracy of the test implementation of the neural network; and forming a sparsity parameter in dependence on the accuracy of the neural network.

The method may further comprise, identifying a target coefficient channel, iteratively: applying the sparsity algorithm according to the sparsity parameter to the coefficient channels of the set of filters of the layer; operating the test implementation of the neural network on training input data using the set of filters for the layer so as to form training output data; in dependence on the training output data, assessing the accuracy of the test implementation of the neural network; and forming an updated sparsity parameter in dependence on the accuracy of the neural network.

The method may further comprise forming the sparsity parameter in dependence on a parameter optimisation technique configured to balance the level of sparsity to be applied to the set of filters as indicated by the sparsity parameter against the accuracy of the network.

According to a fourth aspect of the invention there is provided a data processing system for training a neural network comprising a plurality of layers, each layer being configured to combine a respective set of filters with data input to the layer so as to form output data for the layer, wherein each set of filters comprises a plurality of coefficient channels, each coefficient channel of the set of filters corresponding to a respective data channel in the data input to the layer, and the output data comprises a plurality of data channels, each data channel corresponding to a respective filter of the set of filters, the data processing system comprising coefficient identification logic configured to: identify a target coefficient channel of the set of filters; and identify a target data channel of the plurality of data channels in the data input to the layer, the target data channel corresponding to the target coefficient channel of the set of filters; and wherein the data processing system is arranged to configure a runtime implementation of the neural network in which the set of filters of the preceding layer do not comprise that filter which corresponds to the target data channel.

According to a fifth aspect of the invention there is provided a computer implemented method of training a neural network configured to combine a set of coefficients with respective input data values, the method comprising: so as to train a test implementation of the neural network: applying sparsity to one or more of the coefficients according to a sparsity parameter, the sparsity parameter indicating a level of sparsity to be applied to the set of coefficients; operating the test implementation of the neural network on training input data using the coefficients so as to form training output data; in dependence on the training output data, assessing the accuracy of the neural network; and updating the sparsity parameter in dependence on the accuracy of the neural network; and configuring a runtime implementation of the neural network in dependence on the updated sparsity parameter.

The method may further comprise iteratively performing the applying, operating, forming and updating steps so as to train a test implementation of the neural network.

The method may further comprise iteratively updating the set of coefficients in dependence on the accuracy of the neural network.

The method may further comprise implementing the neural network in dependence on the updated sparsity parameter.

Applying sparsity to a coefficient may comprise setting that coefficient to zero.

The accuracy of the neural network may be assessed by comparing the training output data to verified output data for the training input data.

The method may further comprise, prior to applying sparsity to one or more coefficients, operating the test implementation of the neural network on the training input data using the coefficients so as to form the verified output data.

The method may further comprise assessing the accuracy of the neural network using a cross-entropy loss equation that depends on the training output data and the verified output data.

The method may further comprise updating the sparsity parameter in dependence on a parameter optimisation technique configured to balance the level of sparsity to be applied to the set to coefficients as indicated by the sparsity parameter against the accuracy of the network.

The parameter optimisation technique may use a cross-entropy loss equation that depends on the sparsity parameter and the accuracy of the neural network.

Updating the sparsity parameter may be performed further in dependence on a weighting value configured to bias the test implementation of the neural network towards maintaining the accuracy of the network or increasing the level of sparsity applied to the set to coefficients as indicated by the sparsity parameter.

Updating the sparsity parameter may be performed further in dependence on a defined maximum level of sparsity to be indicated by the sparsity parameter.

The neural network may comprise a plurality of layers, each layer configured to combine a respective set of coefficients with respective input data values to that layer so as to form an output for that layer.

The method may further comprise iteratively updating a respective sparsity parameter for each layer.

The number of coefficients in the set of coefficients for each layer of the neural network may be variable between layers, and updating the sparsity parameter may be performed further in dependence on the number of coefficients in each set of coefficients such that the test implementation of the neural network is biased towards updating the respective sparsity parameters so as to indicate a greater level of sparsity to be applied to sets of coefficients comprising a larger number of coefficients relative to sets of coefficients comprising fewer coefficients.

The sparsity parameter may indicate a percentage of the set of coefficients to which sparsity is to be applied.

Applying sparsity may comprise applying sparsity to a plurality of groups of the coefficients, each group comprising a predefined plurality of coefficients.

Applying sparsity to a group of coefficients may comprise setting each of the coefficients in that group to zero.

Configuring a runtime implementation of the neural network may comprise: applying sparsity to a plurality of groups of the coefficients according to the updated sparsity parameter; compressing the groups of coefficients according to a compression scheme aligned with the groups of coefficients so as to represent each group of coefficients by an integer number of one or more compressed values; and storing the compressed groups of coefficients in memory for subsequent use by the implemented neural network.

Each group may comprise one or more subsets of coefficients of the set of coefficients, each group may comprise n coefficients and each subset may comprise m coefficients, where m is greater than 1 and n is an integer multiple of m, the method may further comprise: compressing the groups of coefficients according to the compression scheme by compressing the one or more subsets of coefficients comprised by each group so as to represent each subset of coefficients by an integer number of one or more compressed values.

Applying sparsity may comprise modelling the set of coefficients using a differentiable function so as to identify a threshold value in dependence on the sparsity parameter, and applying sparsity in dependence on that threshold value, such that the sparsity parameter can be updated by modifying the threshold value by backpropagating one or more gradient vectors using the differentiable function.

According to a sixth aspect of the invention there is provided a data processing system for training a neural network configured to combine a set of coefficients with respective input data values, the data processing system comprising: pruner logic configured to apply sparsity to one or more of the coefficients according to a sparsity parameter, the sparsity parameter indicating a level of sparsity to be applied to the set of coefficients; a test implementation of the neural network configured to operate on training input data using the coefficients so as to form training output data; network accuracy logic configured to assess, in dependence on the training output data, the accuracy of the neural network; and sparsity learning logic configured to update the sparsity parameter in dependence on the accuracy of the neural network; and wherein the data processing system is arranged to configure a runtime implementation of the neural network in dependence on the updated sparsity parameter.

The data processing system may be embodied in hardware on an integrated circuit. There may be provided a method of manufacturing, at an integrated circuit manufacturing system, a data processing system. There may be provided an integrated circuit definition dataset that, when processed in an integrated circuit manufacturing system, configures the system to manufacture a data processing system. There may be provided a non-transitory computer readable storage medium having stored thereon a computer readable description of a data processing system that, when processed in an integrated circuit manufacturing system, causes the integrated circuit manufacturing system to manufacture an integrated circuit embodying a data processing system.

There may be provided an integrated circuit manufacturing system comprising: a non-transitory computer readable storage medium having stored thereon a computer readable description of the data processing system; a layout processing system configured to process the computer readable description so as to generate a circuit layout description of an integrated circuit embodying the data processing system; and an integrated circuit generation system configured to manufacture the data processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 7a shows exemplary pruner logic for applying unstructured sparsity.

FIG. 7b shows exemplary pruner logic for applying structured sparsity.

Figure 1:
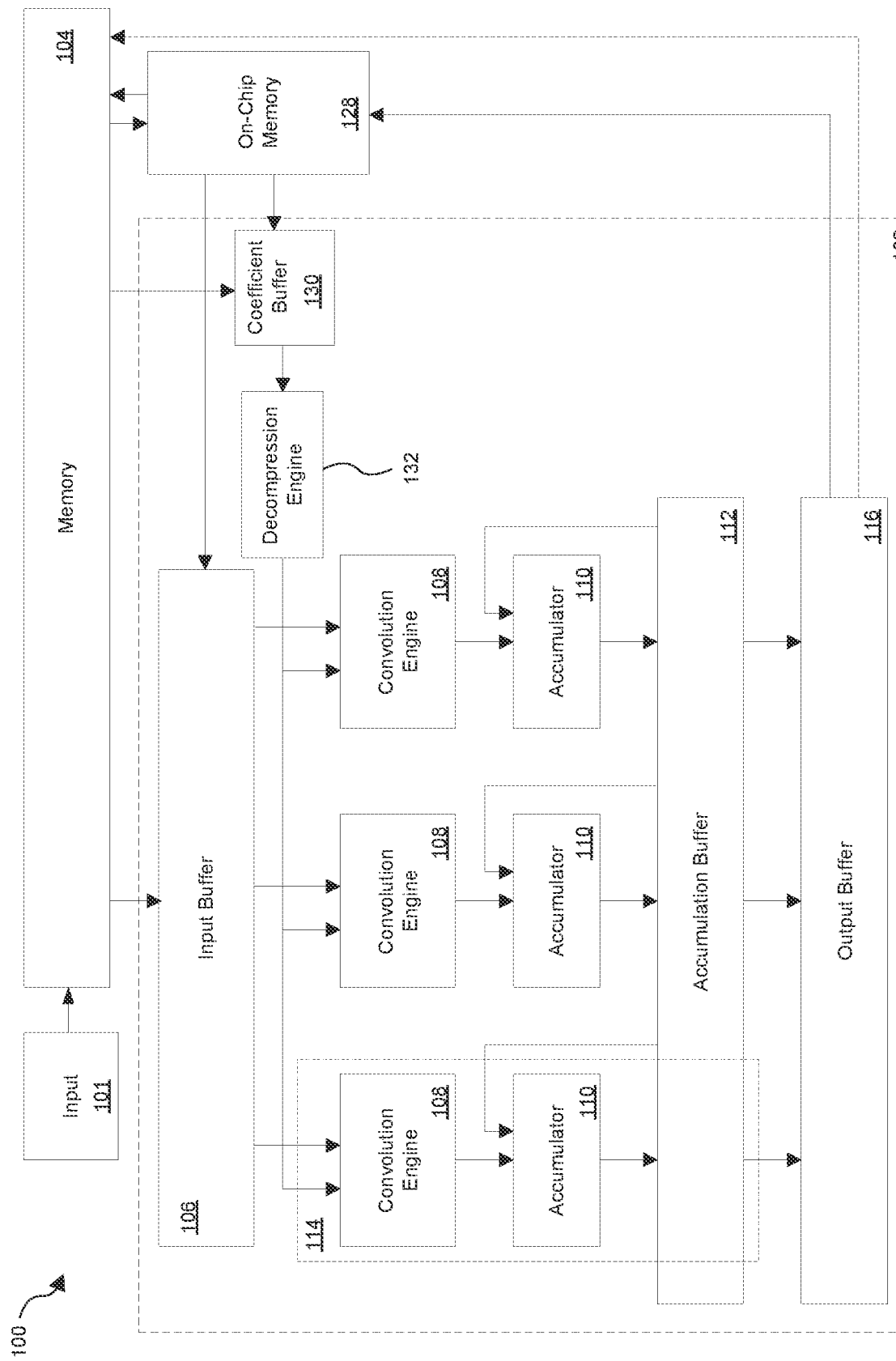
FIG. 1 shows an exemplary implementation of a neural network.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Neural Networks

A data processing system 100 for implementing a neural network is illustrated in FIG. 1. Data processing system 100 may comprise hardware components (e.g. hardware processing units) and software components (e.g. firmware, and the procedures and tasks for execution at the hardware processing units). Data processing system 100 comprises an accelerator 102 for performing the operations of a neural network. The accelerator 102 may be implemented in hardware, software, or any combination thereof. The accelerator may be referred to as a Neural Network Accelerator (NNA). The accelerator comprises a plurality of configurable resources which enable different kinds of neural network, such as convolutional neural networks, fully-convolutional neural networks, recurrent neural networks, and multi-layer perceptrons, to be implemented at the accelerator.

The implementation of a neural network will be described with respect to the data processing system shown in the particular example of FIG. 1 in which the accelerator 102 includes a plurality of processing elements 114 each comprising a convolution engine, but it will be understood that—unless stated otherwise—the principles described herein are generally applicable to any data processing system comprising an accelerator capable of performing the operations of a neural network.

The data processing system comprises input 101 for receiving data input to the data processing system. In image classification applications, the input to the neural network may include image data representing one or more images. For example, for an RGB image, the image data may be in the format x×y×3, where x and y are the pixel dimensions of the image across three colour channels (i.e. R, G and B). The input data may be referred to as tensor data. It will be appreciated that the principles described herein are not limited to use in image classification applications. For example, the principles described herein could be used in semantic image segmentation applications, object detection applications, super-resolution applications, speech recognition/speech-to-text applications, or any other suitable types of applications. The input to the neural network also includes one or more sets of coefficients that are to be combined with the input data. As used herein, sets of coefficient may also be referred to as weights.

In FIG. 1, the accelerator includes an input buffer 106, a plurality of convolution engines 108, a plurality of accumulators 110, an accumulation buffer 112, and an output buffer 116. Each convolution engine 108, together with its respective accumulator 110 and its share of the resources of the accumulation buffer 112, represents a processing element 114. Three processing elements are shown in FIG. 1 but in general there may be any number. Each processing element may receive a set of coefficients from a coefficient buffer 130 and input values from input buffer 106. The coefficient buffer may be provided at the accelerator—e.g. on the same semiconductor die and/or in the same integrated circuit package. By combining the set of coefficients and the input data the processing elements are operable to perform the operations of a neural network.

In general, accelerator 102 may implement any suitable processing logic. For instance, in some examples the accelerator may comprise reduction logic (e.g. for implementing max-pooling or average-pooling operations), element processing logic for performing per-element mathematical operations (e.g. adding two tensors together), or activation logic (e.g. for applying activation functions such as sigmoid functions or step functions). Such units are not shown in FIG. 1 for simplicity.

The processing elements of the accelerator are independent processing subsystems of the accelerator which can operate in parallel. Each processing element 114 includes a convolution engine 108 configured to perform convolution operations between sets of coefficients and input values. Each convolution engine 108 may comprise a plurality of multipliers, each of which is configured to multiply a coefficient and a corresponding input data value to produce a multiplication output value. The multipliers may be, for example, followed by an adder tree arranged to calculate the sum of the multiplication outputs. In some examples, these multiply-accumulate calculations may be pipelined.

Neural networks are typically described as comprising a number of "layers". At a "layer" of the neural network, a set of coefficients may be combined with a respective set of input data values. A large number of operations must typically be performed at an accelerator in order to execute each "layer" operation of a neural network. This is because the input data and sets of coefficients are often very large. Since it may take more than one pass of a convolution engine to generate a complete output for a convolution operation (e.g. because a convolution engine may only receive and process a portion of the set of coefficients and input data values) the accelerator may comprise a plurality of accumulators 110. Each accumulator 110 receives the output of a convolution engine 108 and adds the output to the previous convolution engine output that relates to the same operation. Depending on the implementation of the accelerator, a convolution engine may not process the same operation in consecutive cycles and an accumulation buffer 112 may therefore be provided to store partially accumulated outputs for a given operation. The appropriate partial result may be provided by the accumulation buffer 112 to the accumulator at each cycle.

Figure 2A:
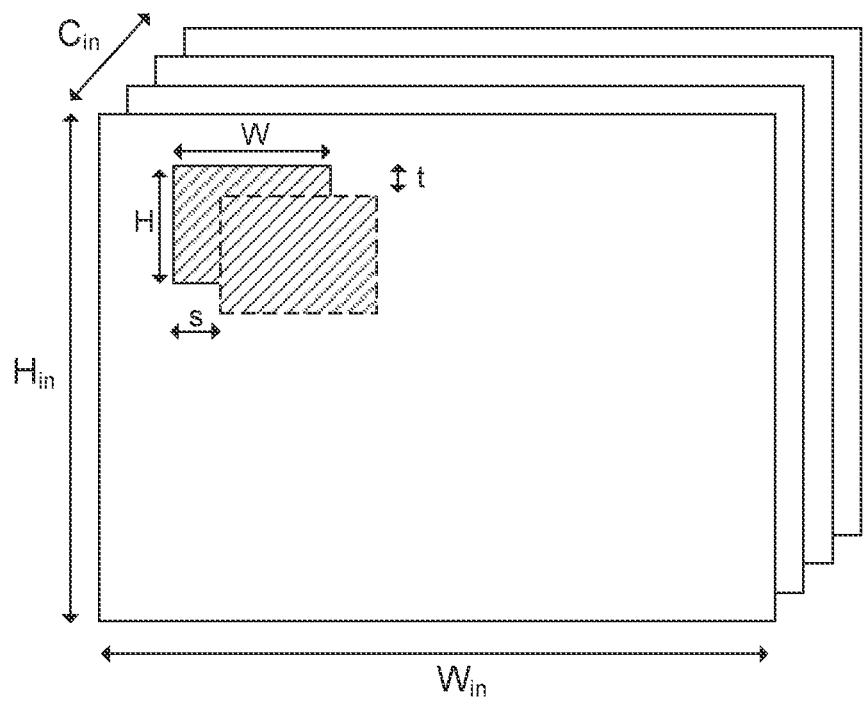
FIG. 2a shows an example of the structure of data used in a convolutional layer of a neural network.

The accelerator 102 of FIG. 1 could be used to implement a "convolution layer". Data input to a convolution layer may have the dimensions $B \times C_{in} \times H_{in} \times W_{in}$. By way of example, as shown in FIG. 2a, the data input to a convolutional layer may be arranged as $C_{in}$ channels of data, where each channel has a spatial dimension $H_{in} \times W_{in}$—where $H_{in}$ and $W_{in}$ are, respectively, height and weight dimensions. In FIG. 2a, the input data is shown comprising four data channels (i.e. $C_{in}=4$). Data input to a convolution layer may also be defined by a batch size, B. The batch size, B, is not shown in FIG. 2a, but defines the number of sets of data input to a convolution layer. For example, in image classification applications, the batch size may refer to the number of separate images in the input data.

A neural network may comprise J layers that are each configured to combine, respectively, a set of coefficients with data input to that layer. Each of those J layers may have associated therewith a set of coefficients, $w_j$. As described herein, j is the index of each layer of the J layers. In other words, $\{w_j\}_{j=1}^J$ represents the sets of coefficients $w_j$ for J layers. In general, the number and value of the coefficients in a set of coefficients may vary between layers such that for a first layer, the number of coefficients may be defined as $w_j^0 \ldots w_j^{n1}$; for a second layer, the number of coefficients may be defined as $w_2^0 \ldots w_2^{n2}$; and for the Jth layer, the number of coefficients may be defined as $w_j^0 \ldots w_j^{nJ}$ where the number of coefficients in the first layer is n1, the number of coefficients in the second layer is n2, and the number of coefficients in the Jth layer is nJ.

In general, the set of coefficients for a layer may be in any suitable format. For example, the set of coefficients may be represented by a p-dimensional tensor where p≥1, or in any other suitable format. Herein, the format of each set of coefficients will be defined with reference to a set of dimensions—an input number of channels $C_{in}$, an output number of channels $C_{out}$, a height dimension H, and a width dimension W—although it is to be understood that the format of a set of coefficients could be defined in any other suitable way.

A set of coefficients for performing a convolution operation on input data having the format shown in FIG. 2a may have dimensions $C_{out} \times C_{in} \times H \times W$. The $C_{in}$ dimension is not shown for the set of coefficients in FIG. 2a—but typically the number of coefficient channels in a set of coefficients corresponds to (e.g. is equal to) the number of data channels in the input data with which that set of coefficients is to be combined (e.g. in the example shown in FIG. 2a, $C_{in}=4$). The $C_{out}$ dimension is not shown in FIG. 2a—but denotes the number of channels in the output when the set of coefficients are combined with the input data. The dimensions of sets of coefficients used by a neural network can vary greatly. By way of non-limiting examples only, a set of coefficients for use in a convolutional layer may have dimensions such as 64×3×3×3, 512×512×3×3, or 64×3×11×11.

Figure 2B:
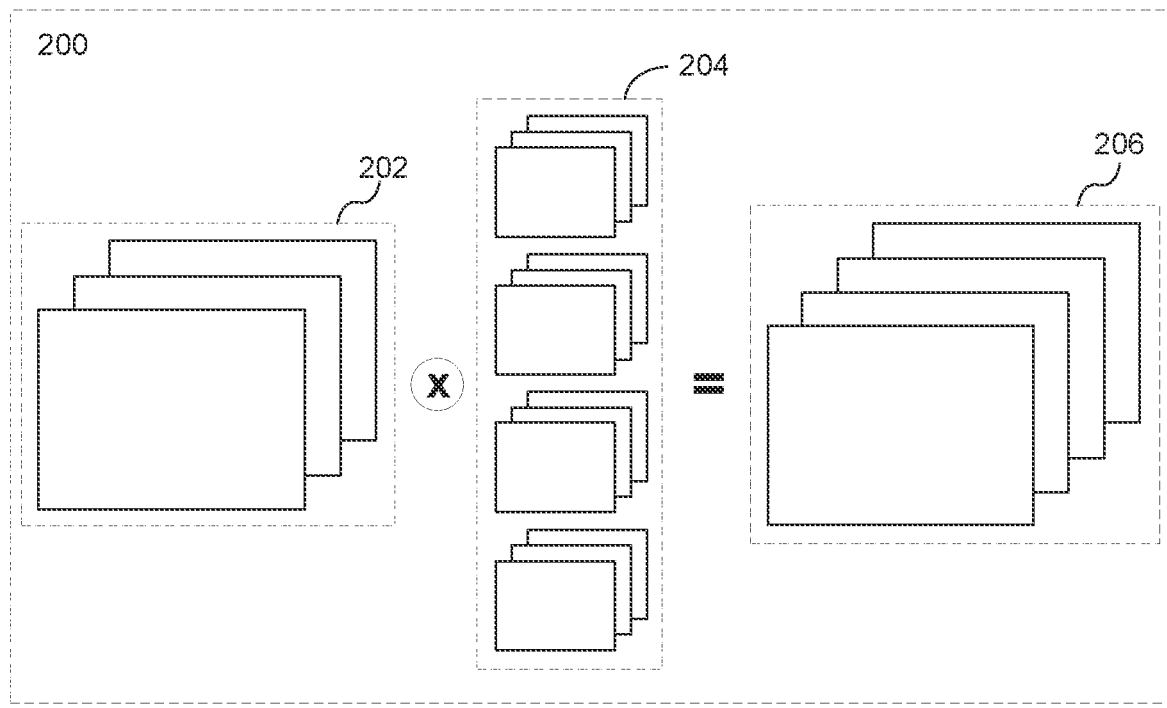
FIG. 2b schematically illustrates a convolutional layer arranged to combine a set of coefficients with input data so as to form output data.

In a convolution layer, a set of coefficients can be combined with the input data according to a convolution operation across a number of steps in direction s and t, as illustrated in FIG. 2. That is, in a convolutional layer, the input data is processed by convolving the input data using a set of coefficients associated with that layer. By way of example, FIG. 2b schematically illustrates a convolutional layer 200 arranged to combine of a set of coefficients 204 with input data 202 so as to form output data 206. Data output by a convolution layer may have the dimensions $B \times C_{out} \times H_{out} \times W_{out}$. That is, data output by a convolutional layer may be arranged as $C_{out}$ channels of data, where each channel has a spatial dimension $H_{out} \times W_{out}$—where $H_{out}$ and $W_{out}$ are, respectively, height and weight dimensions. Data output by a convolution layer may also be defined by a batch size, B. In this example, the set of coefficients 204 comprises four filters, each filter comprising multiple coefficients of the set of coefficients. Each filter may comprise a unique set and/or arrangement of coefficients of the set of coefficients, or two or more of the filters may be identical to each other. The input data 202 has three data channels. Each filter comprises three coefficient channels, corresponding to the three data channels in the input data 202 (e.g. $C_{in}=3$). That is, the number of coefficient channels in each filter in a set of coefficients for a layer may correspond with the number of data channels in the data input to that layer. The output data 206 has four channels (e.g. $C_{out}=4$). That is, the number of filters comprised by the set of coefficients for a layer may correspond with a number of data channels in the output data. In FIG. 2b, $H_{out}=H_{in}$ and $W_{out}=W_{in}$, although it is to be understood that this need not be the case—e.g. $H_{out}$ may not equal $H_{in}$ and/or $W_{out}$ may not equal $W_{in}$.

The input data 202 may be combined with the set of coefficients 204 by convolving each filter of the set of coefficients with the input data—where the first coefficient channel of each filter is convolved with the first data channel of the input data, the second coefficient channel of each filter is convolved with the second data channel of the input data, and the third coefficient channel of each filter is convolved with the third data channel of the input data. The results of said convolution operations with each filter for each input channel can be summed (e.g. accumulated) so as to form the output data values for each output channel. It is to be understood that a set of coefficients need not be arranged as a set of filters as shown in FIG. 2b, and may in fact be arranged in any other suitable manner.

Numerous other types of neural network "layer" exist that are configured to a combine a set of coefficients with data input to that layer. Another example of such a neural network layer is a fully-connected layer. A set of coefficients for performing a fully-connected operation may have dimensions $C_{out} \times C_{in}$. A fully-connected layer may perform a matrix multiplication between a set of coefficients and an input tensor. Fully-connected layers are often utilised in recurrent neural networks and multi-layer perceptrons. A convolution engine (e.g. one or more of convolution engines 108 shown in FIG. 1) can be used to implement a fully-connected layer. Other examples of neural network layers that are configured to a combine sets of coefficients with data input to those layer include variations on convolutional layers, such as depthwise convolutional layers, dilated convolutional layers, grouped convolutional layers, and transposed convolution (deconvolution) layers. A neural network may consist a combination of different layers. For example, a neural network may comprise one or more convolution layers (e.g. to extract features from images), followed by one or more fully-connected layers (e.g. to provide a prediction based on the extracted features).

For a first layer of a neural network, the 'input data' can be considered to be the initial input to the neural network. The first layer processes the input data and generates a first set of intermediate data that is passed to the second layer. The first set of intermediate data can be considered to form the input data for the second layer which processes the first intermediate data to produce output data in the form of second intermediate data. Where the neural network contains a third layer, the third layer receives the second intermediate data as input data and processes that data to produce third intermediate data as output data. Therefore, reference herein to input data may be interpreted to include reference to input data for any layer. For example, the term input data may refer to intermediate data which is an output of a particular layer and an input to a subsequent layer. This is repeated until the final layer produces output data that can be considered to be the output of the neural network.

Returning to FIG. 1, the accelerator 102 may include an input buffer 106 arranged to store input data required by the accelerator (e.g. the convolution engines) and a coefficient buffer 130 arranged to store sets of coefficients required by the accelerator (e.g. the convolution engines) for combination with the input data according to the operations of the neural network. The input buffer may include some or all of the input data relating to the one or more operations being performed at the accelerator on a given cycle. The coefficient buffer may include some or all of the sets of coefficients relating to the one or more operations being processed at the accelerator on a given cycle. The various buffers of the accelerator shown in FIG. 1 may be implemented in any suitable manner—e.g. as any number of data stores which are local to the accelerator (e.g. on the same semiconductor die and/or provided within the same integrated circuit package) or accessible to the accelerator over a data bus or other interconnect.

A memory 104 may be accessible to the accelerator—e.g. the memory may be a system memory accessible to the accelerator over a data bus. An on-chip memory 128 may be provided for storing sets of coefficients and/or other data (such as input data, output data, etc.). The on-chip memory may be local to the accelerator such that the data stored in the on-chip memory may be accessed by the accelerator without consuming memory bandwidth to the memory 104 (e.g. a system memory accessible over a system bus). Data (e.g. sets of coefficients, input data) may be periodically written into the on-chip memory from memory 104. The coefficient buffer 130 at the accelerator may be configured to receive coefficient data from the on-chip memory 128 so as to reduce the bandwidth between the memory and the coefficient buffer. The input buffer 106 may be configured to receive input data from the on-chip memory 128 so as to reduce the bandwidth between the memory and the input buffer. The memory may be coupled to the input buffer and/or the on-chip memory so as to provide input data to the accelerator.

The sets of coefficients received at input 101 may be in a compressed format—e.g. a data format having a reduced memory footprint. That is, prior to inputting the sets of coefficients to input 101 of data processing system 100, the sets of coefficients may be compressed so as to be represented by an integer number of one or more compressed values—as will be described in further detail herein. For this reason, data processing system 100 may comprise a decompression engine 132. Decompression engine 132 may be configured to decompress any compressed sets of coefficients read from coefficient buffer 130 into the convolution engines 108. Additionally, or alternatively, the input data received at input 101 may be in a compressed format. In this example, the data processing system 100 may comprise a decompression engine (not shown in FIG. 1) positioned between the input buffer 106 and the convolution engines 108, and configured to decompress any compressed input data read from the input buffer 106 into the convolution engines 108.

The accumulation buffer 112 may be coupled to an output buffer 116, to allow the output buffer to receive intermediate output data of the operations of a neural network operating at the accelerator, as well as the output data of the end operation (i.e. the last operation of a network implemented at the accelerator). The output buffer 116 may be coupled to the on-chip memory 128 for providing the intermediate output data and output data of the end operation to the on-chip memory 128.

Typically, it is necessary to transfer a large amount of data from the memory to the processing elements. If this is not done efficiently, it can result in a high memory bandwidth requirement, and high power consumption, for providing the input data and sets of coefficients to the processing elements. This is particularly the case when the memory is "off-chip"—that is, implemented in a different integrated circuit or semiconductor die from the processing elements. One such example is system memory accessible to the accelerator over a data bus. In order to reduce the memory bandwidth requirements of the accelerator when executing a neural network, it is advantageous to provide a memory which is on-chip with the accelerator at which at least some of the sets of coefficients and/or input data required by an implementation of a neural network at the accelerator may be stored. Such a memory may be "on-chip" (e.g. on-chip memory 128) when the memory is provided on the same semiconductor die and/or in the same integrated circuit package.

The various exemplary connections are shown separately in the example of FIG. 1, but, in some embodiments, some or all of them may be provided by one or more shared data bus connections. It should also be understood that other connections may be provided, as an alternative to or in addition to those illustrated in FIG. 1. For example, the output buffer 114 may be coupled to the memory 104, for providing output data directly to the memory 104. Likewise, in some examples, not all of the connections illustrated in FIG. 1 may be necessary. For example, the memory 104 need not be coupled to the input buffer 106 which may obtain input data directly from an input data source—e.g. a camera subsystem configured to capture images at a device comprising the data processing system.

As described herein, in image classification applications, image data representing one or more images may be input to the neural network, and the output of that neural network may be data indicative of a probability (or set of probabilities) that each of those images belongs to a particular classification (or set of classifications). In image classification applications, in each of a plurality of layers of the neural network a set of coefficients are combined with data input to that layer in order to identify characteristic features of the input data. Neural networks are typically trained to improve the accuracy of their outputs by using training data. In image classification examples, the training data may comprise data indicative of one or more images and respective predetermined labels for each of those images. Training a neural network may comprise operating the neural network on the training input data using untrained or partially-trained sets of coefficients so as to form training output data. The accuracy of the training output data can be assessed, e.g. using a loss function. The sets of coefficients can be updated in dependence on the accuracy of the training output data through the processes called gradient descent and back-propagation. For example, the sets of coefficients can be updated in dependence on the loss of the training output data determined using the loss function. Back-propagation can be considered to be a process of calculating gradients for each coefficient with respect to a loss function. This can be achieved by using chain rule starting at the final output of the loss function and working backwards to each layer's coefficients. Once all gradients are known, a gradient descent (or its derivative) algorithm can be used to update each coefficient according to its gradients calculated through back-propagation. Gradient descent can be performed in dependence on a learning rate parameter, which indicates the degree to which the coefficients can be changed in dependence on the gradients at each iteration of the training process. These steps can be repeated, so as to iteratively update the sets of coefficients.

The sets of coefficients used within a typical neural network can be highly parameterised. That is, the sets of coefficients used within a typical neural network often comprise large numbers of non-zero coefficients. Highly parameterised sets of coefficients for a neural network can have a large memory footprint. As the sets of coefficients are stored in memory (e.g. memory 104 or on-chip memory 128), rather than a local cache, a significant amount of memory bandwidth may be also required at run time to read in highly parameterised sets of coefficients (e.g. 50% of the memory bandwidth in some examples). The time taken to read highly parameterised sets of coefficients in from memory can also increase time taken for a neural network to provide an output for a given input—thus increasing the latency of the neural network. Highly parameterised sets of coefficients can also place a large computational demand on the processing elements 114 of the accelerator 102—e.g. by causing the processing elements to perform a large number of multiplication operations between coefficients and respective data values.

Data Processing System

Figure 4:
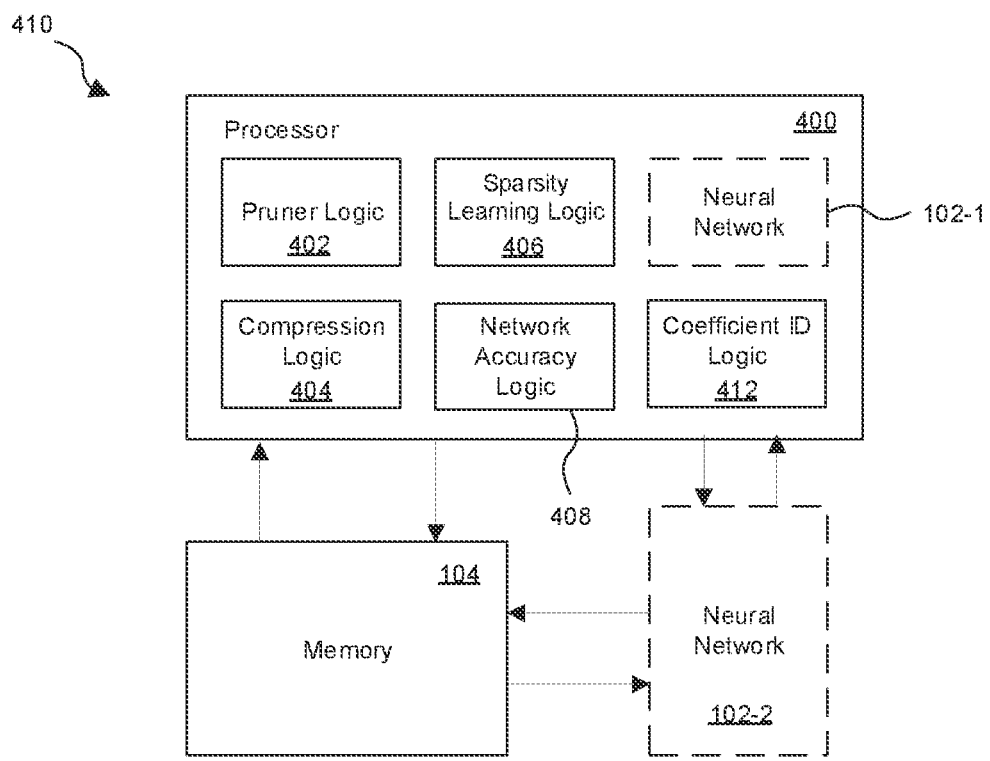
FIG. 4 shows a data processing system in accordance with the principles described herein.

FIG. 4 shows a data processing system in accordance with the principles described herein for addressing one or more of the above identified problems.

The data processing system 410 shown in FIG. 4 comprises memory 104 and processor 400. In an example, processor 400 includes a software implementation of a neural network 102-1. The software implementation of a neural network 102-1 may have the same properties as accelerator 102 described with reference to FIG. 1. In another example, the data processing system 410 includes a hardware implementation of a neural network 102-2. The hardware implementation of a neural network 102-2 may have the same properties as accelerator 102 described with reference to FIG. 1. In some examples, the data processing system may comprise a neural network accelerator implemented in a combination of hardware and software.

Processor 400 shown in FIG. 4 also comprises pruner logic 402, compression logic 404, sparsity learning logic 406, network accuracy logic 408, and coefficient identification logic 412. Each of logic 402, 404, 406, 408 and 412 may be implemented in fixed-function hardware, software running at general purpose hardware within processor 400, or any combination thereof. The functions of each of logic 402, 404, 406, 408 and 412 will be described in further detail herein. In some examples (not shown in FIG. 4), one or more of pruner logic 402, compression logic 404, sparsity learning logic 406, network accuracy logic 408 and coefficient identification logic 412 may alternatively, or additionally, be implemented as logical units within a hardware implementation of a neural network 102-2.

Memory 104 may be a system memory accessible to the processor 400 and/or hardware implementation of a neural network 102-2 over a data bus. Alternatively, memory 104 may be on-chip memory local to the processor 400 and/or hardware implementation of a neural network 102-2. Memory 104 may store sets of coefficients to be operated on by the processor 400 and/or hardware implementation of a neural network 102-2, and/or sets of coefficients that have been operated on and output by the processor 400 and/or hardware implementation of a neural network 102-2.

Coefficient Compression

One way of reducing the memory footprint of the sets of coefficients, and thereby reducing the bandwidth required to read the coefficient data from memory at run time, is to compress the sets of coefficients. That is, each set of coefficients can be compressed such that it is represented by an integer number of one or more compressed data values. Said compression may be performed by compression logic 404 shown in FIG. 4. Sets of uncompressed coefficients stored in memory 104 may be input to compression logic 404 for compression. Compression logic 404 may output a compressed set of coefficients to memory 104.

The sets of coefficients may be compressed at compression logic 404 in accordance with a compression scheme. One example of such a compression scheme is the Single Prefix Grouped Coding 8 (SPGC8) compression scheme. It is to be understood that numerous other suitable compression schemes exist, and that the principles described herein are not limited to application with the SPGC8 compression scheme. The SPGC8 compression scheme is described in full (although not identified by the SPGC8 name) in UK patent application: GB2579399.

Figure 3A:
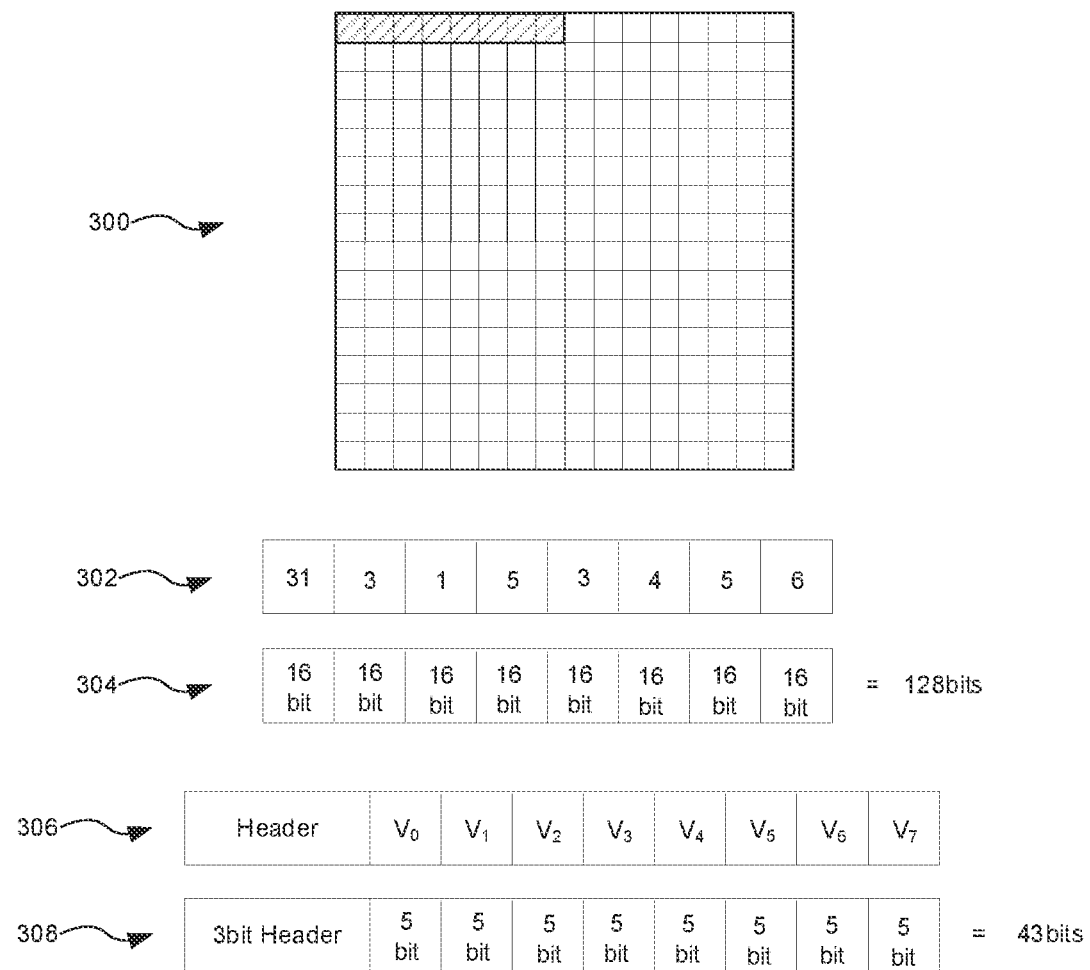
FIG. 3a illustrates the compression of an exemplary of coefficients in accordance with a compression scheme.

FIG. 3a illustrates the compression of an exemplary set of coefficients in accordance with a compression scheme. The compression scheme may be the SPGC8 compression scheme, although the principles described herein may apply to other compression schemes. FIG. 3a shows a set of coefficients 300 represented by a 16×16 tensor of coefficients. Set of coefficients 300 may be all of or part of a two-dimensional tensor of coefficients, as shown, or one plane of a p-dimensional tensor of coefficients where p≥3. As described herein, a set of coefficients may comprise any number of coefficients, and take any suitable format.

A number of subsets of the set of coefficients may be compressed in order to compress the set coefficients. Each subset of coefficients comprises a plurality of coefficients. For example, a subset of coefficients may comprise eight coefficients. The coefficients in a subset may be contiguous in the set of coefficients. For example, a subset of coefficients is shown in the hatched area overlaying set of coefficients 300. This subset of coefficients comprise eight contiguous coefficients arranged in a single row (e.g. a subset of coefficients having dimensions 1×8). More generally, a subset of coefficients could have any dimensions, such as, for example, 2×2, 4×4 etc. In examples where the set of coefficients is a p-dimensional tensor where p≥1, the subset of coefficients may also be a p-dimensional tensor where p≥1.

Each coefficient may be an integer number. For example, exemplary 1×8 subset of coefficients 302 comprises coefficients 31, 3, 1, 5, 3, 4, 5, 6. Each coefficient may be encoded in a binary number. Each coefficient in the subset shown in FIG. 3a is a positive (e.g. unsigned) binary number. In an example, each coefficient may be encoded in a 16-bit binary number—as shown at 304—although more or fewer bits may be selected. Sixteen bits may be provided to encode each coefficient in order that coefficients up to a value of 65,536 can be encoded. Thus, in this example, 128 bits are required to encode a subset of eight coefficients, as shown in 304. However, often 16 bits are not required to encode each coefficient. That is, most coefficients in a set of coefficients have a value below, or even significantly below, the maximum encodable value.

If any of the coefficient values in the set of coefficients are negative coefficient values, the set of coefficients may first be transformed such that all of the coefficient values are positive (e.g. unsigned). For example, negative coefficients may be transformed to be odd values whereas positive coefficients may be transformed to be even values in the unsigned representation. This transformed set of coefficients may be used as an input to the SPGC8 compression scheme.

According to the SPGC8 compression scheme, a number of bits is identified that is sufficient to encode the largest coefficient value in the subset of coefficients. That number of bits is then used to encode each coefficient in the subset of coefficients. Header data associated with the subset of coefficients indicates the number of bits has been used to encode each of the coefficients in the subset.

For example, a compressed subset of coefficients can be represented by header data and a plurality of body portions ($V_0$-$V_7$), as shown in 306. In subset of coefficients 302, the largest coefficient value is 31, which can be encoded using 5 bits of data. In this example, the header data indicates that 5 bits are going to be used to encode each coefficient in the subset of coefficients. The header data itself has a bit cost—for example, 3 bits—whilst each body portion encodes the coefficient values using 5 bits. For example, the number of bits used in the header portion may be the minimum number of bits required to encode the number of bits per body portion (e.g. in the example shown in FIG. 3a, 3 bits can be used to encode the number 5 in binary). In this example, the subset of coefficients 302 can therefore be encoded in a compressed for using 43 bits of data, as shown in 308, rather than in 128 bits in its uncompressed form, as shown in 304.

In other words, in order to compress a subset of coefficients, header data is generated that comprises h-bits and a plurality of body portions are generated each comprising b-bits. Each of the body portions corresponds to a coefficient in the subset. The value of b is fixed within the subset and the header data for a subset comprises an indication of b for the body portions of that subset. The body portion size, b, is identified by locating a bit position of a most significant leading one across all the coefficients in the uncompressed subset. The header data is generated so as to comprise a bit sequence encoding the body portion size, and a body portion comprising b-bits is generated for each of the coefficients in the subset by removing none, one or more leading zeros from each coefficient of the uncompressed subset.

In some examples, two adjacent subsets of coefficients can be interleaved during compression according to the SPGC8 compression scheme. For example, a first subset of eight coefficients may comprise coefficients $V_0$, $V_1$, $V_2$, $V_3$, $V_4$, $V_5$, $V_6$ and $V_7$. An adjacent subset of eight coefficients may comprise $V_8$, $V_9$, $V_{10}$, $V_{11}$, $V_{12}$, $V_{13}$, $V_{14}$ and $V_{15}$. When the first and second subsets of coefficients are compressed according to a compression scheme that uses interleaving, the first compressed subset of coefficients may comprise an integer number of compressed values representing coefficients $V_0$, $V_2$, $V_4$, $V_6$, $V_8$, $V_{10}$, $V_{12}$ and $V_{14}$.

The second compressed subset of coefficients may comprise an integer number of compressed values representing coefficients $V_1$, $V_3$, $V_5$, $V_7$, $V_9$, $V_{11}$, $V_{13}$ and $V_{15}$.

Unstructured Sparsity

Sets of coefficients used by a neural network can comprise one or more coefficient values that are zero. Sets of coefficients that include a significant number of zero coefficients can be said to be sparse. As described herein, a neural network comprises a plurality of layers, each of which is configured to, respectively, combine a set of coefficients with input data values to that layer—e.g. by multiplying each coefficient in the set of coefficients with a respective input data value. Consequently, for sparse sets of coefficients, a significant number of operations in a layer of the neural network can result in a zero output.

Figure 14A:
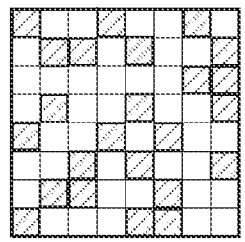
FIG. 14a shows an example of unstructured sparsity in a set of coefficients.

Sparsity can be artificially inserted into a set of coefficients. That is, sparsity can be applied to one or more coefficients in a set of coefficients. Applying sparsity to a coefficient comprises setting that coefficient to zero. This may be achieved by applying a sparsity algorithm to the coefficients of a set of coefficients. Pruner logic 402 shown in FIG. 4 may be configured to apply sparsity to one or more coefficients in a set of coefficients. In one example, pruner logic 402 may apply sparsity to a set of coefficients by performing a process called magnitude-based pruning. Trained sets of coefficients often comprise a number of coefficient values that are close to (or even very close to) zero, but are non-zero. Magnitude-based pruning involves applying sparsity to a percentage, fraction, or portion of the coefficients in the set of coefficients that are closest to zero. The proportion of the coefficients to be set to zero may be determined in dependence on a sparsity parameter, which indicates a level of sparsity to be applied to the set of coefficients. The result of magnitude-based pruning is that the level of sparsity in a set of coefficients can be increased, often without significantly impacting the accuracy of the network—as it is the lower value (and hence typically least salient) coefficients that have been set to zero. FIG. 14a shows an example of a set of coefficients to which sparsity has been applied, e.g. by a process such as magnitude-based pruning. In FIG. 14a, sparse coefficients are shown using hatching. FIG. 14a is an example of unstructured sparsity. Coefficients values that have low magnitude (i.e. a magnitude close to zero) may be distributed randomly (e.g. in an unstructured manner) throughout a set of coefficients. Thus, for this reason, the sparsity resulting from approaches such as magnitude-based pruning can be said to be unstructured.

Magnitude-based pruning is just one example of a process for applying sparsity to a set of coefficients. Numerous other approaches can be used to apply sparsity to a set of coefficients. For example, the pruner logic 402 may be configured to randomly select a percentage, fraction, or portion of the coefficients of a set of coefficients to which sparsity is to be applied.

As described herein, for sparse sets of coefficients, a significant number of operations in layers of the neural network can result in a zero output. For this reason, a neural network can be configured to skip (i.e. not perform) 'multiply by zero' operations (e.g. operations that involve multiplying an input data value with a zero coefficient value). Thus, in this way, and by artificially inserting sparsity into a set of coefficients, the computational demand on the neural network (e.g. the processing elements 114 of accelerator 102 shown in FIG. 1) can be reduced by requiring fewer multiplications to be performed.

FIG. 7a shows exemplary pruner logic for applying unstructured sparsity. In some examples, pruner logic 402 shown in FIG. 4 has the properties of pruner logic 402a described with reference to FIG. 7a. It is to be understood that pruner logic 402a shown in FIG. 7a is just one example of logic configured to apply sparsity to a set of coefficients. Other forms of logic could be used to apply sparsity to a set of coefficients.

The inputs to pruner logic 402a include $s_j$ 502, which represents the set of coefficients for the $j^{th}$ layer of the neural network. As described herein, the set of coefficients for a layer may be in any suitable format. For example, the set of coefficients may be represented by a p-dimensional tensor of coefficients where $p \geq 1$, or by in any other suitable format.

The inputs to pruner logic 402a also include $s_j$ 504, which represents a sparsity parameter for the $j^{th}$ layer of the neural network. In other words, $\{s_j\}_{j=1}^{J}$ represents the sparsity parameters $s_j$ for J layers. The sparsity parameter may indicate a level of sparsity to be applied to the set of coefficients, $w_j$, by the pruner logic 402a. For example, the sparsity parameter may indicate a percentage, fraction, or portion of the set of coefficients to which sparsity is to be applied by the pruner logic 402a. The sparsity parameter, $s_j$, may be set (e.g. somewhat arbitrarily by a user) in dependence on an assumption of how much sparsity can be introduced into a set of coefficients without significantly affecting the accuracy of the neural network. In other examples, as described in further detail herein, the sparsity parameter, $s_j$, can be learned as part of the training process for a neural network.

The sparsity parameter, $s_j$, may be provided in any suitable form. For example, the sparsity parameter may be a decimal number in the range 0 to 1 (inclusive)—that number representing the percentage of the set of coefficients to which sparsity is to be applied. For example, a sparsity parameter $s_j$ of 0.4 may indicate that sparsity is to be applied to 40% of the coefficients in the set of coefficients, $w_j$.

In other examples, the sparsity parameter may be provided as a number in any suitable range (e.g. between −5 and 5). In these examples, pruner logic 402a may comprise a normalising logic 704 configured to normalise the sparsity parameter such that it lies in range between 0 and 1. One exemplary way of achieving said normalisation is to use a sigmoid function—e.g.

$$\sigma(x) = \frac{1}{1+e^{-x}} \ldots$$

For example, the sigmoid function may transition between a minimum y-value approaching 0 at an x-value of −5 to a maximum y-value approaching 1 at an x-value of 5. In this way, the sigmoid function can be used to convert an input sparsity parameter in the range −5 to 5 to a normalised sparsity parameter in the range 0 to 1. In an example, the normalising logic 704 may use the $$\sigma(s_j) = \frac{1}{1+e^{-s_j}},$$

sigmoid function, so as to normalise the sparsity parameter $s_j$. The output of the normalising logic 704 may be a normalised sparsity parameter $s_j^\circ$. It is to be understood that the normalising logic may use other functions, for example hard-sigmoid( ) that achieve the same normalisation with a different set of mathematical operations on the input sparsity parameter. For the purpose of the example equations provided herein, a sparsity parameter in the range 0 to 1 (either as provided, or after normalisation by a normalisation function) will be denoted by $s_j^o$.

As described herein, each coefficient in a set of coefficients may be an integer number. In some examples, a set of coefficients may include one or more positive integer value coefficients, and one or more negative integer values. In these examples, pruner logic 402a may include logic 700 configured to determine the absolute value of each coefficient in the set of coefficients, $w_j$. In this way, each of the values in set of coefficients at the output of unit 700 is a positive integer value.

Pruner logic 402a shown in FIG. 7a includes quantile logic 706, which is configured to determine a threshold in dependence on the sparsity parameter, $s_j^o$, and the set of coefficients comprising absolute coefficient values. For example, the sparsity parameter may indicate a percentage of sparsity to be applied to a set of coefficients—e.g. 40%. In this example, quantile logic 706 would determine a threshold value, below which 40% of the absolute coefficient values exist. In this example, the quantile logic can be described as using a non-differentiable quantile methodology. That is, the quantile logic 706 shown in FIG. 7a does not attempt to model the set of coefficients using a function, but rather empirically sorts the absolute coefficient values (e.g. in ascending or descending order) and sets the threshold at the appropriate value. For example, quantile logic 706 may determine a threshold τ in accordance with Equation (1).

$$\tau = \text{Quantile}(\text{abs}(w_j), s_j^o) \quad (1)$$

Pruner logic 402a comprises subtraction logic 708, which is configured to subtract the threshold value determined by quantile logic 706 from each of the determined absolute coefficient values. In FIGS. 7a to d, the "minus" symbol on one of the inputs to subtraction logic (e.g. subtraction logic 708 in FIG. 7a) is used to show that that input is being subtracted from the other input, labelled with a "plus" symbol. As a result, any of the absolute coefficient values having a value less than the threshold value will be represented by a negative number, whilst any of the absolute coefficient values having a value greater than the threshold value will be represented by a positive number. In this way, pruner logic 402a has identified the least salient coefficients (e.g. the coefficients of least importance to the set of coefficients). In this example, the least salient coefficients are those having an absolute value below the threshold value. In other words, the pruner logic has identified the required percentage of coefficients in the input set of coefficients, $w_j$, having a value closest to zero.

Pruner logic 402a comprises step logic 710, which is configured to convert each of the negative coefficient values in the output of subtraction logic 708 to zero, and convert each of the positive coefficient values in the output of subtraction logic 708 to one. One exemplary way of achieving this is to use a step function. For example, the step function may output a value of 0 for negative input values, and output a value of 1 for a positive input value. The output of step logic 710 is a binary tensor having the same dimensions as the input set of coefficients, $w_j$. A binary tensor is a tensor consisting of binary values 0 and 1. The binary tensor output by step logic 710 can be used as a "sparsity mask".

The pruner logic 402a comprises multiplication logic 714, which is configured to perform an element-wise multiplication of the sparsity mask and the input set of coefficients, $w_j$. That is, in each coefficient position where the binary sparsity mask includes a "0", the coefficient in the set of coefficients $w_j$ will be multiplied by 0—giving an output will be zero. In this way, sparsity has been applied to that coefficient—i.e. it has been set to zero. In each coefficient position where the binary sparsity mask includes a "1", the coefficient in the set of coefficients $w_j$ will be multiplied by 1—and so its value will be unchanged. The output of pruner logic 402a is an updated set of coefficients, $w'_j$ 506 to which sparsity has been applied. For example, multiplication logic 714 may perform a multiplication in accordance with Equation (2), where $\text{Step}(\text{abs}(W_j) - \tau)$ represents the binary tensor output by step logic 710.

$$w'_j = \text{Step}(\text{abs}(w_j) - \tau) * w_j \quad (2)$$

Figure 7C:
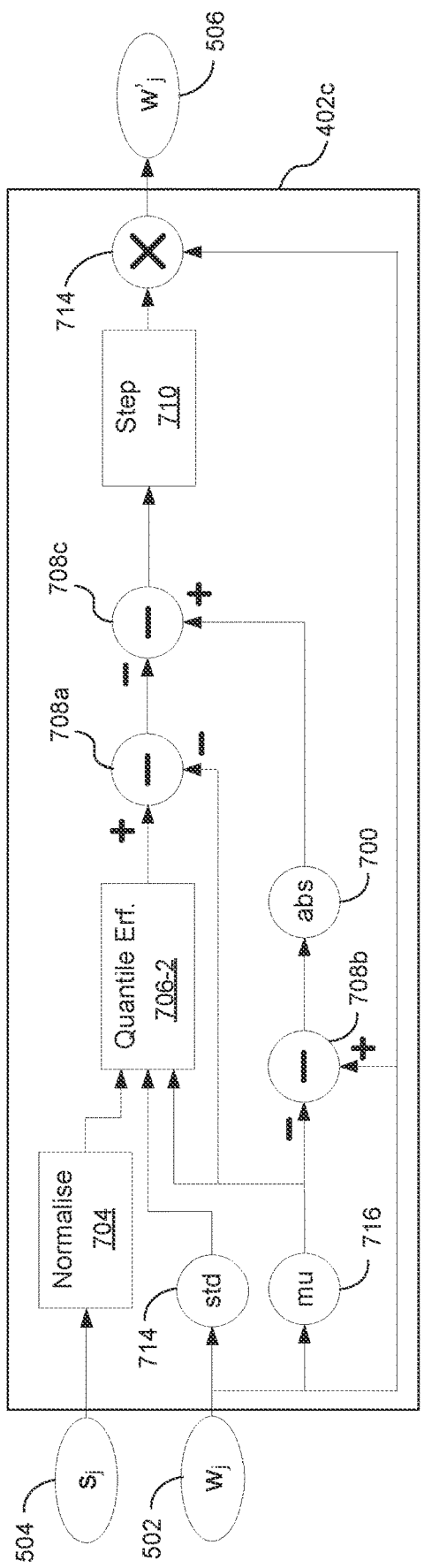
FIG. 7c shows alternative exemplary pruner logic for applying unstructured sparsity.

FIG. 7c shows alternative exemplary pruner logic for applying unstructured sparsity. In some examples, pruner logic 402 shown in FIG. 4 has the properties of pruner logic 402c described with reference to FIG. 7c. It is to be understood that pruner logic 402c shown in FIG. 7c is just one example of logic configured to apply sparsity to a set of coefficients. Other forms of logic could be used to apply sparsity to a set of coefficients.

The inputs to pruner logic 402c shown in FIG. 7c include $w_j$ 502 and $s_j$ 504, as described with reference to FIG. 7a. Pruner logic 402c shown in FIG. 7c also comprises normalising logic 704, which performs the same function as normalising logic 704 described with reference to FIG. 7a.

The pruner logic 402c shown in FIG. 7c may be particularly suitable when the coefficients in the set of coefficients are normally distributed. A normal (or Gaussian) distribution can be fully described by its mean, µ, and standard deviation, Ψ. Pruner logic 402c shown in FIG. 7c comprises logic 714 configured to determine the standard deviation, $\Psi_{w_j}$, of the coefficients in set of coefficients 502, and logic 716 configured to determine the mean, $\mu_{w_j}$, of the coefficients in set of coefficients 502.

Pruner logic 402c shown in FIG. 7c comprises quantile logic 706-2. The quantile logic 702-2 may use a differentiable function, such as the inverse error function (e.g. $\text{erf}^{-1}$), to model the set of coefficients using the mean, $\mu_{w_j}$, and standard deviation, of that set of coefficients (as determined in logic 714 and 716). Quantile logic 706-2 is configured to determine a threshold τ in dependence on the sparsity parameter $s_j^o$. For example, when the differentiable function is an inverse error function, this can be achieved in accordance with Equations (3), where $\Psi_{w_j}$ is the standard deviation determined by logic 714 and $\mu_{w_j}$ is the mean determined by logic 716.

$$\tau = \mu_{w_j} + \Psi_{w_j} \sqrt{2} \text{erf}^{-1}(s_j^o) \quad (3)$$

Pruner logic 402c shown in FIG. 7c comprises subtraction logic 708a configured to subtract the mean $\mu_{w_j}$ determined by logic 716 from the threshold τ. Thus, with reference to Equation (3), the output of subtraction logic 708a is $\Psi_{w_j} \sqrt{2} \text{erf}^{-1}(s_j^o)$.

Pruner logic 402c shown in FIG. 7c comprises subtraction logic 708b configured to subtract the mean $\mu_{w_j}$ determined by logic 716 from each coefficient in the set of coefficients $w_j$ 502. This has the effect of centring the distribution of the coefficients in the set of coefficients about 0.

Pruner logic 402c shown in FIG. 7c comprises logic 700 configured to determine the absolute value of each value in the output of subtraction logic 708b. In this way, each of the values in the output of unit 700 is a positive integer value.

Pruner logic 402c shown in FIG. 7c comprises subtraction logic 708c configured to subtract the output of subtraction logic 708a from each of the absolute values determined by logic 700. As a result, any of the absolute values having a value less than the output of subtraction logic 708a (e.g. $\Psi_{w_j} \sqrt{2} \text{ erf}^{-1} (s_j^\circ)$) will be represented by a negative number, whilst any of the absolute values having a value greater than the output of subtraction logic 708a (e.g. $\Psi_{w_j} \sqrt{2} \text{ erf}^{-1} (s_j^\circ)$) will be represented by a positive number. In this way, pruner logic 402c has identified the least salient coefficients (e.g. the coefficients of least importance to the set of coefficients). In this example, the least salient coefficients are those in positions where the output of subtraction logic 708c is negative.

Pruner logic 402c comprises step logic 710, which performs the same function as step logic 710 described with reference to FIG. 7a. The output of step logic 710 is a binary tensor having the same dimensions as the input set of coefficients, $w_j$. A binary tensor is a tensor consisting of binary values 0 and 1. The binary tensor output by step logic 710 can be used as a "sparsity mask".

The pruner logic 402c comprises multiplication logic 714, which is configured to perform an element-wise multiplication of the sparsity mask and the input set of coefficients, $w_j$—as described with reference to multiplication logic 714 described with reference to FIG. 7a. The output of pruner logic 402c is an updated set of coefficients, $w'_j$ 506 to which sparsity has been applied. For example, multiplication logic 714 may perform a multiplication in accordance with Equation (4), where Step $(\text{abs}(w_j-\mu_{w_j})-(\tau-\mu_{w_j}))$ represents the binary tensor output by step logic 710.

$$w_j' = \text{Step}(\text{abs}(w_j-\mu_{w_j})-(\tau-\mu_{w_j}))*w_j \quad (4)$$

As described herein, the pruner logic 402c described with reference to FIG. 7c may be particularly suitable when the coefficients in the set of coefficients are normally distributed. Thus, the distribution of the sets of coefficients $w_j$ may be tested or inferred so as to decide which implementation of the pruner logic to use to apply sparsity to those coefficients (e.g. the pruner logic described with reference to FIG. 7a or 7c). That is, if the sets of coefficients are not normally distributed, it may be preferable to apply sparsity using the pruner logic described with reference to FIG. 7a. If the sets of coefficients are (or are approximately) normally distributed, it may be preferable to apply sparsity using the pruner logic described with reference to FIG. 7c.

Structured Sparsity

According to the principles described herein, synergistic benefits can be achieved by applying sparsity to a plurality of coefficients of a set of coefficients in a structured manner that is aligned with the compression scheme that will be used to compress that set of coefficients. This can be achieved by logically arranging pruner logic 402 and compression logic 404 of FIG. 4 as shown in FIG. 5.

Figure 5:
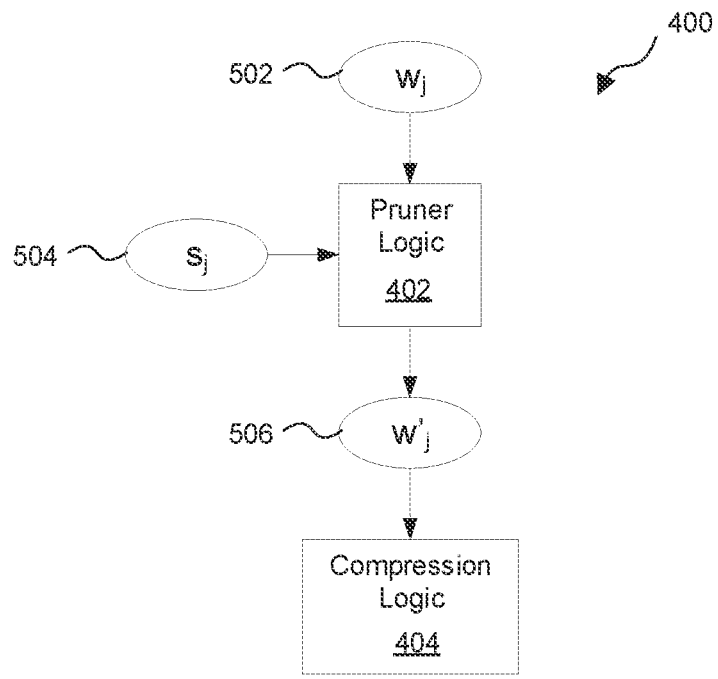
FIG. 5 shows a data processing system implementing logic for compressing a set of coefficients for subsequent use in a neural network in accordance with the principles described herein.
Figure 6:
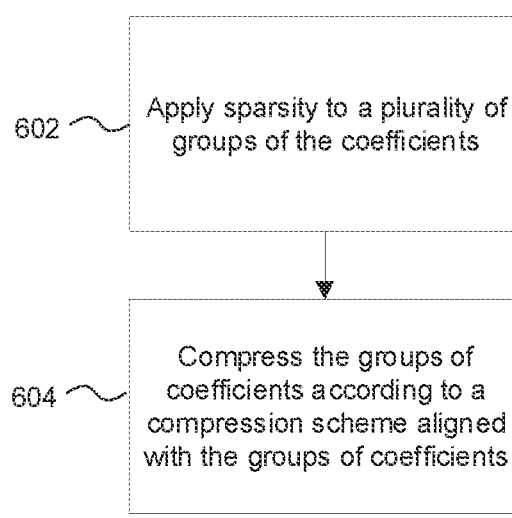
FIG. 6 shows a method of compressing a set of coefficients for subsequent use in a neural network in accordance with the principles described herein.

FIG. 5 shows a data processing system implementing logic for compressing a set of coefficients for subsequent use in a neural network in accordance with the principles described herein. The method of compressing a set of coefficients for subsequent use in a neural network will be described with reference to FIG. 6.

The inputs to pruner logic 402 include $w_j$ 502, which represents the set of coefficients for the $j^{th}$ layer of the neural network as described herein. The inputs to pruner logic 402 also include $s_j$ 504, which represents a sparsity parameter for the $j^{th}$ layer of the neural network as described herein. Both $w_j$ 502 and $s_j$ 504 may be read into the pruner logic 402 from memory (such as memory 104 in FIG. 4). The sparsity parameter may indicate a level of sparsity to be applied to the set of coefficients, $w_j$, by the pruner logic 402.

Pruner logic 402 is configured to apply sparsity to a plurality of groups of the coefficients, each group comprising a predefined plurality of coefficients. This is method step 602 in FIG. 6. A group of coefficients may be a plurality of coefficients occupying contiguous positions in the set of coefficients, although this need not be the case. The group of coefficients may have any suitable format. For example, the group of coefficients may comprise a p-dimensional tensor of coefficients where $p \geq 1$, or any other suitable format. In one example, each group of coefficients comprises sixteen coefficients arranged in a single row (e.g. a group of coefficients having dimensions 1×16). More generally, a groups of coefficients could have any dimensions, such as, for example, 2×2, 4×4 etc. As described herein, a set of coefficients for performing a convolution operation on input data may have dimensions $C_{out} \times C_{in} \times H \times W$. A group of said set of coefficients may have dimensions 1×16×1×1 (i.e. where the 16 coefficients in each group are in corresponding positions in each of 16 input channels). As described herein, a set of coefficients for performing a fully-connected operation may have dimensions $C_{out} \times C_{in}$. A group of said set of coefficients may have dimensions 1×16 (i.e. where the 16 coefficients in each group are in corresponding positions in each of 16 input channels). In another example, a coefficient channel of one or more of the filters of a set of filters of a layer (e.g. as described with reference to FIG. 2b) can be treated as a group of coefficients to which sparsity can be applied.

Applying sparsity to a group of coefficients may comprise setting each of the coefficients in that group to zero. This may be achieved by applying a sparsity algorithm to the coefficients of a set of coefficients. The number of groups of coefficients to which sparsity is to be applied may be determined in dependence on the sparsity parameter, which can indicate a percentage, fraction, or portion of the set of coefficients to which sparsity is to be applied by the pruner logic 402. The sparsity parameter, may be set (e.g. somewhat arbitrarily by a user) in dependence on an assumption of how much sparsity can be introduced into a set of coefficients without significantly affecting the accuracy of the neural network. In other examples, as described in further detail herein, the sparsity parameter, can be learned as part of the training process for a neural network. The output of pruner logic 402 is an updated set of coefficients, $w'_j$ 506 comprising a plurality of sparse groups of coefficients (e.g. a plurality of groups of coefficients each consisting of coefficients having a value of '0').

FIG. 7b shows exemplary pruner logic for applying structured sparsity. In some examples, pruner logic 402 shown in FIGS. 4 and 5 has the properties of pruner logic 402b described with reference to FIG. 7b. It is to be understood that pruner logic 402b shown in FIG. 7b is just one example of logic configured to apply structured sparsity to a set of coefficients. Other forms of logic could be used to apply sparsity to a set of coefficients.

The inputs to pruner logic 402b shown in FIG. 7b include $w_j$ 502 and $s_j$ 504, as described with reference to FIG. 7a. Pruner logic 402b shown in FIG. 7b also comprises normalising logic 704 and logic 700, each of which perform the same function as the respective logic described with reference to FIG. 7a.

Pruner logic 402b shown in FIG. 7b includes reduction logic 702, which is configured to divide the set of coefficients received from logic 700 into multiple groups of coefficients, such that each coefficient of the set is allocated to only one group and all of the coefficients are allocated to a group. Each group of coefficients may comprise a plurality of coefficients. Each group of coefficients identified by the reduction logic may comprise the same number of coefficients and may have the same dimensions. The reduction logic is configured to represent each group of coefficients by a single value. For example, the single value representing a group could be the average (e.g. mean, medium or mode) of the plurality of coefficients within that group. In another example, the single value for a group could be the maximum coefficient value within that group. This may be termed max pooling. In an example, a group may comprise a channel of the set of coefficients, as described herein. Reducing a channel of coefficients to a single value may be termed global pooling. Reducing a channel of coefficients to the maximum coefficient value within that channel may be termed global max pooling. The output of reduction logic 702 may be a reduced tensor having one or more dimensions an integer multiple smaller than the tensor representing the set of coefficients, the integer being greater than 1. Each value in the reduced tensor may represent a group of coefficients of the set of absolute coefficients input to reduction logic 702. Where reduction logic 702 performs a pooling operation, such as max pooling, global pooling, or global max pooling, the reduced tensor may be referred to as a pooled tensor.

Figure 8:
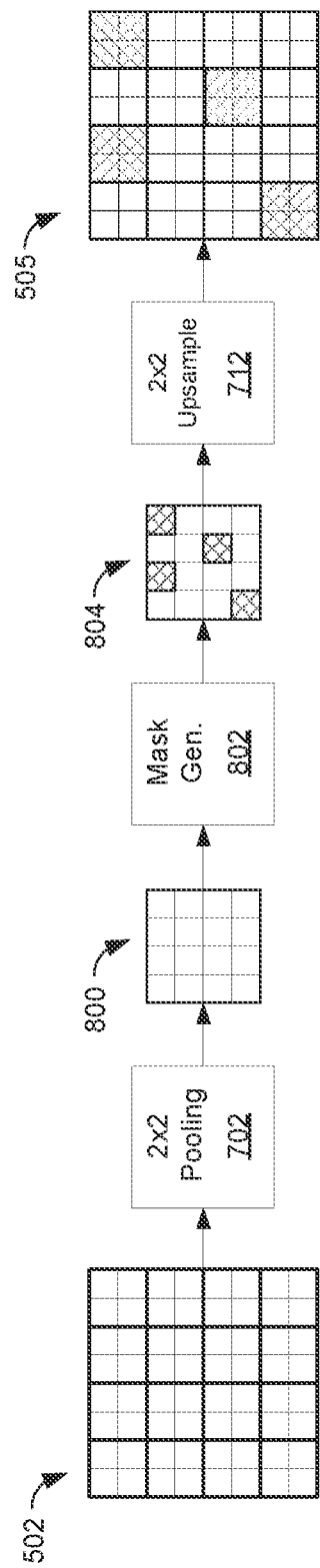
FIG. 8 is a schematic showing an exemplary application of structured sparsity.

The function performed by the reduction logic 702 is schematically illustrated in FIG. 8. In FIG. 8, 2×2 pooling 702 is performed on set of coefficients 502. Set of coefficients 502 may be those output by logic 700 shown in FIG. 7b. In this example, the set of coefficients 502 is represented by an 8×8 tensor of coefficients. The set of coefficients 502 is logically divided into 16 groups of four coefficients (e.g. each group represented by a 2×2 tensor of coefficients). The groups are indicated in FIG. 8 by a thick border around each group of four coefficients in set of coefficients 502. By performing 2×2 pooling 702, each group of four coefficients in the set of coefficients 502 is represented by a single value in reduced tensor 800 as described herein. For example, the top-left group of coefficients in set of coefficients 502 may be represented by the top-left value in reduced tensor 800. The reduced tensor 800 shown in FIG. 8 is represented by a tensor having dimensions 4×4. That is, the reduced tensor 800 has dimensions two times smaller than the 8×8 tensor representing set of coefficients 502.

Returning to FIG. 7b, pruner logic 402b includes quantile logic 706, which is configured to determine a threshold in dependence on the sparsity parameter, $s_j^\sigma$, and the reduced tensor. For example, the sparsity parameter may indicate a percentage of sparsity to be applied to a set of coefficients— e.g. 25%. In this example, quantile logic 706 would determine a threshold value, below which 25% of the values in the reduced tensor exist. In this example, the quantile logic can be described as using a non-differentiable quantile methodology. That is, the quantile logic 702 does not attempt to model the values in the reduced tensor using a function, but rather empirically sorts the values in the reduced tensor (e.g. in ascending or descending order) and sets the threshold at the appropriate value. For example, quantile logic 706 may determine a threshold z in accordance with Equation (5).

$$\tau = \text{Quantile}(\text{Reduction}(\text{abs}(w_j)), s_j^\sigma) \quad (5)$$

Pruner logic 402b comprises subtraction logic 708, which is configured to subtract the threshold value determined by quantile logic 706 from each of the values in the reduced tensor. As a result, any of the values in the reduced tensor having a value less than the threshold value will be represented by a negative number, whilst any of the values in the reduced tensor having a value greater than the threshold value will be represented by a positive number. In this way, pruner logic 402b has identified the least salient values in the reduced tensor. In this example, the least salient values in the reduced tensor are those having a value below the threshold value. The least salient values in the reduced tensor correspond to the least salient groups of coefficients in the set of coefficients (e.g. the groups of coefficients of least importance to the set of coefficients).

Pruner logic 402b comprises step logic 710, which is configured to convert each of the negative coefficient values in the output of subtraction logic 708 to zero, and convert each of the positive coefficient values in the output of subtraction logic 708 to one. One exemplary way of achieving this is to use a step function. For example, the step function may output a value of 0 for negative input values, and output a value of 1 for a positive input value. The output of step logic 710 is a binary tensor having the same dimensions as the reduced tensor output by reduction logic 702. A binary tensor is a tensor consisting of binary values 0 and 1. Said binary tensor may be referred to as a reduced sparsity mask tensor. Where reduction logic 702 performs a pooling operation, such as max pooling or global pooling, the reduced sparsity mask tensor may be referred to as a pooled sparsity mask tensor.

The functions performed by quantile logic 706, subtraction logic 708 and step logic 710 can collectively be referred to as mask generation 802. Mask generation 802 is schematically illustrated in FIG. 8. In FIG. 8, mask generation 802 is performed on reduced tensor 800 (e.g. using quantile logic 706 and subtraction logic 708 as described with reference to FIG. 7b) so as to generate reduced sparsity mask tensor 804. The reduced sparsity mask tensor 804 comprises four binary "0"s represented by hatching, and 12 binary "1"s.

Returning to FIG. 7b, pruner logic 402b comprises expansion logic 712, which is configured to expand the reduced sparsity mask tensor so as to generate a sparsity mask tensor of the same dimensions as the tensor of coefficients input to the reduction logic 702. Expansion logic 712 may perform upsampling, e.g. nearest neighbour upsampling. For example, where the reduced sparsity mask tensor comprises a binary "0", the sparsity mask tensor would comprise a corresponding group consisting of a plurality of binary "0"s, said group having the same dimensions as the groups into which the set of coefficients was divided by reduction logic 702. For example, where reduction logic 702 performs a global pooling operation, expansion logic 712 may perform an operation termed global upsampling. The binary tensor output by expansion logic 712 can be used as a "sparsity mask", and so may be referred to herein as a sparsity mask tensor. In an example, nearest neighbour upsampling can be achieved by expansion logic 712 with deconvolution, also known as convolution transpose, layers that are implemented by configuring convolution engines (e.g. convolution engines 108 shown in FIG. 1) in appropriate manner.

The functions performed by the expansion logic 712 are schematically illustrated in FIG. 8. In FIG. 8, 2×2 upsampling, e.g. nearest neighbour upsampling, is performed on reduced sparsity mask tensor 804 so as to generate sparsity mask tensor 505. For each binary "0" in reduced sparsity mask tensor 804, the sparsity mask tensor comprises a corresponding 2×2 group of binary "0"s. As described herein, binary "0"s are shown in FIG. 8 by hatching. The sparsity mask tensor 505 has the same dimensions (i.e. 8×8) as tensor of coefficients 502.

The pruner logic 402b comprises multiplication logic 714, which is configured to perform an element-wise multiplication of the sparsity mask tensor and the input set of coefficients, $w_j$—as described with reference to multiplication logic 714 described with reference to FIG. 7a. As the sparsity mask tensor comprises groups of binary "0"s, sparsity will be applied to groups of coefficients of the set of coefficients, $w_j$. The output of pruner logic 402b is an updated set of coefficients, $w'_j$ 506 to which sparsity has been applied. For example, multiplication logic 714 may perform a multiplication in accordance with Equation (6), where Expansion(Step(Reduction(abs($w_j$))−τ)) represents the binary tensor output by expansion logic 712.

$$w_j' = \text{Expansion}(\text{Step}(\text{Reduction}(\text{abs}(w_j))-\tau))*w_j \quad (6)$$

Figure 7D:
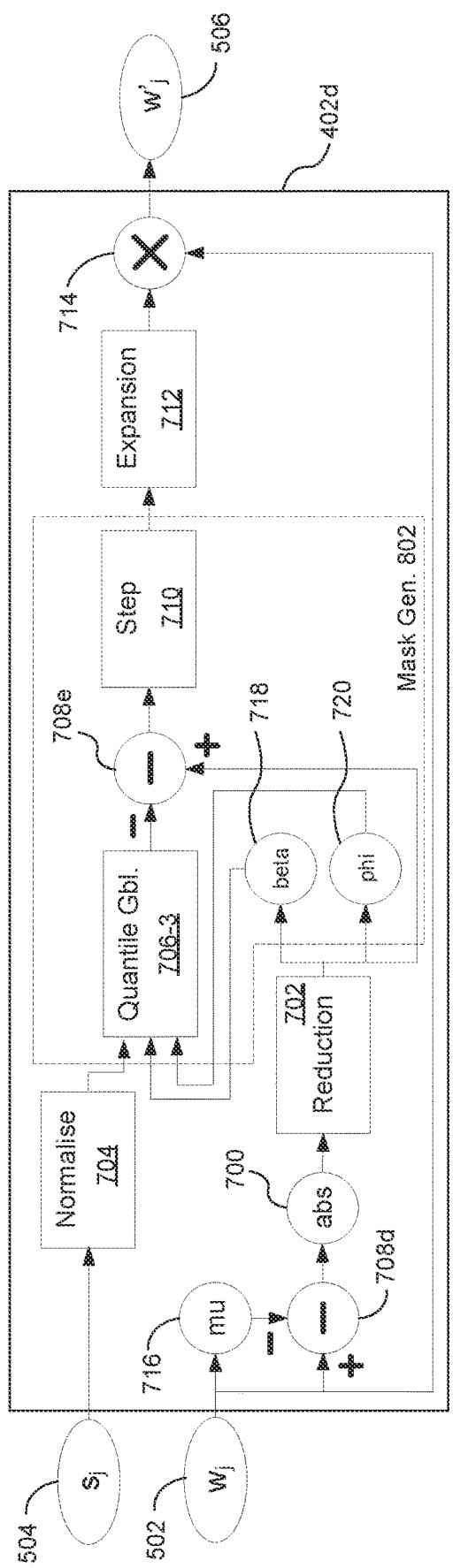
FIG. 7d shows alternative exemplary pruner logic for applying structured sparsity.

FIG. 7d shows alternative exemplary pruner logic for applying structured sparsity. In some examples, pruner logic 402 shown in FIGS. 4 and 5 has the properties of pruner logic 402d described with reference to FIG. 7d. It is to be understood that pruner logic 402d shown in FIG. 7d is just one example of logic configured to apply structured sparsity to a set of coefficients. Other forms of logic could be used to apply structured sparsity to a set of coefficients.

The inputs to pruner logic 402d shown in FIG. 7d include $w_j$ 502 and $s_j$ 504, as described with reference to FIG. 7a. Pruner logic 402d shown in FIG. 7d also comprises normalising logic 704, which performs the same function as normalising logic 704 described with reference to FIG. 7a.

Pruner logic 402d comprises logic 716 configured to determine the mean, $\mu_{w_j}$, of the coefficients in set of coefficients 502, and subtraction logic 708d to subtract the mean, $\mu_{w_j}$, determined by logic 716 from each coefficient value in the input set of coefficient values 502.

Pruner logic 702 also comprises logic 700 configured to determine the absolute value of each value in the output of subtraction logic 708d. In this way, each of the values in the output of unit 700 is a positive integer value.

Pruner logic 702 comprises reduction logic 702, which performs the same function as reduction logic 702 described with reference to FIG. 7b. That is, the reduction logic 702 is configured to divide the set of coefficients received from logic 700 into multiple groups of coefficients and represent each group of coefficients by a single value. For example, the single value for a group could be the maximum coefficient value within that group. This process is termed "max pooling". The output of reduction logic 702 is a reduced tensor having one or more dimensions an integer multiple smaller than the tensor representing the set of coefficients, the integer being greater than 1. Each value in the reduced tensor represents a group of coefficients of the set of coefficients input to reduction logic 702.

As with the pruner logic 402c described with reference to FIG. 7c, the pruner logic 402d shown in FIG. 7d may be particularly suitable when the coefficients in the set of coefficients are normally distributed. However, when reduction, e.g. max pooling or global max pooling, is performed on a normally distributed set of values, the distribution of those values approach a Gumbel distribution. A Gumbel distribution can be described by a scale parameter, β and a location parameter, Ø. Thus, pruner logic 402d comprises logic 718 configured to determine the scale parameter, $\beta_{w_j}$, of the output of reduction logic 702, Reduction(abs($w_j - \mu_{w_j}$), according to Equation (7), and logic 720 configured to determine the location parameter, $\phi_{w_j}$, of the output of reduction logic 702 according to Equation (8), where γ is the Euler-Mascheroni constant (i.e. 0.577216—rounded to six decimal places).

$$\beta_{w_j} = std(\text{Reduction}(\text{abs}(w_j - \mu_{w_j})))\frac{\sqrt{6}}{\pi} \quad (7)$$

$$\phi_{w_j} = \text{mean}(\text{Reduction}(\text{abs}(w_j - \mu_{w_j}))) - \beta_{w_j}\gamma \quad (8)$$

Pruner logic 702 shown in FIG. 7d comprises quantile logic 706-3. The quantile logic 702 may use a differentiable function to model the set of values in the reduced tensor using the scale parameter, $\beta_{w_j}$, and a location parameter, $\phi_{w_j}$, determined by logic 718 and 720 respectively. Quantile logic 706-3 is configured to determine a threshold τ in dependence on the sparsity parameter $s_j^\sigma$. For example, this can be achieved using a differentiable function in accordance with Equation (9)

$$\tau = \phi_{w_j} - \beta_{w_j}\log\left(\log\left(\frac{1}{s_j^\sigma}\right)\right) \quad (9)$$

Pruner logic 702 shown in FIG. 7d comprises subtraction logic 708e configured to subtract the threshold τ from each of the values in the reduced tensor output by reduction logic 702. As a result, any of the values in the reduced tensor having a value less than the threshold τ will be represented by a negative number, whilst any of the values in the reduced tensor having a value greater than the threshold τ will be represented by a positive number. In this way, pruner logic 402d has identified the least salient values in the reduced tensor. In this example, the least salient values in the reduced tensor are those having a value below the threshold τ. The least salient values in the reduced tensor correspond to the least salient groups of coefficients in the set of coefficients (e.g. the groups of coefficients of least importance to the set of coefficients).

Pruner logic 402d comprises step logic 710, which is configured to convert each of the negative coefficient values in the output of subtraction logic 708e to zero, and convert each of the positive coefficient values in the output of subtraction logic 708e to one. One exemplary way of achieving this is to use a step function. For example, the step function may output a value of 0 for negative input values, and output a value of 1 for a positive input value. The output of step logic 710 is a binary tensor having the same dimensions as the reduced tensor. A binary tensor is a tensor consisting of binary values 0 and 1. Said binary tensor may be referred to as a reduced sparsity mask tensor. The functions performed by quantile logic 706-3, logic 718, logic 720, subtraction logic 708e and step logic 710 can collectively be referred to as mask generation 802.

Pruner logic 402d shown in FIG. 7d comprises expansion logic 712, which is configured to expand the reduced sparsity mask tensor so as to generate a sparsity mask tensor of the same dimensions as the tensor of coefficients input to the reduction logic 702—as described with reference to expansion logic 712 shown in FIG. 7b. The binary tensor output by expansion logic 712 can be used as a "sparsity mask", and so may be referred to herein as a sparsity mask tensor.

Pruner logic 402d comprises multiplication logic 714, which is configured to perform an element-wise multiplication of the sparsity mask tensor and the input set of coefficients, $w_j$—as described with reference to multiplication logic 714 described with reference to FIG. 7a. As the sparsity mask tensor comprises groups of binary "0"s, sparsity will be applied to groups of coefficients of the set of coefficients, $w_j$. The output of pruner logic 402*d* is an updated set of coefficients, $w'_j$ 506 to which sparsity has been applied. For example, multiplication logic 714 may perform a multiplication in accordance with Equation (10), where Expansion(Step(Reduction(abs($W_j-\mu_{w_j}$))$-\tau$)) represents the binary tensor output by expansion logic 712.

$$w_j'=\text{Expansion}(\text{Step}(\text{Reduction}(\text{abs}(w_j-\mu_{w_j}))-\tau)^*w_j \quad (10)$$

As described herein, the pruner logic 402*d* described with reference to FIG. 7*d* may be particularly suitable when the coefficients in the set of coefficients are normally distributed. Thus, the distribution of the sets of coefficients $w_j$ may be tested or inferred so as to decide which implementation of the pruner logic to use to apply structured sparsity to those coefficients (e.g. the pruner logic described with reference to FIG. 7*b* or 7*d*). That is, if the sets of coefficients are not normally distributed, it may be preferable to apply sparsity using the pruner logic described with reference to FIG. 7*b*. If the sets of coefficients are (or are approximately) normally distributed, it may be preferable to apply sparsity using the pruner logic described with reference to FIG. 7*d*.

As described herein, FIG. 7*d* gives an example where reduction, e.g. max pooling or global max pooling, is performed by reduction logic 702 on a normally distributed set of values such that the distribution of those values approach a Gumbel distribution. A Gumbel distribution can be referred to as an extreme value distribution. It is to be understood that other types of extreme value distribution could be used in place of the Gumbel distribution, such as the Weibull distribution or the Frechet distribution. In these examples, the logic depicted in FIG. 7*d* could be modified such that quantile logic models the appropriate distribution so as to determine a threshold. It is to be understood that other types of reduction, e.g. mean, mode or median pooling, could be performed by reduction logic 702 such that the normally distributed set of values approach a different type of distribution. In these examples, the logic depicted in FIG. 7*d* could be modified such that quantile logic models the appropriate distribution so as to determine a threshold.

Returning to FIG. 5, the updated set of coefficients, $w'_j$ 506 may be written directly from pruner logic 402 into compression logic 404 for compression. In other examples, the updated set of coefficients, $w'_j$ 506 may first be written back to memory, such as memory 104 in FIG. 4, prior to being read into compression logic 404 for compression.

Figure 14B:
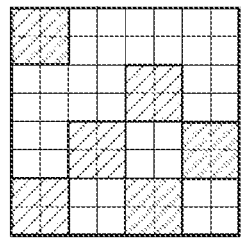
FIGS. 14b to d show examples of structured sparsity sets of coefficients.
Figure 14C:
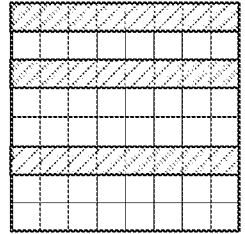
Figure 14D:
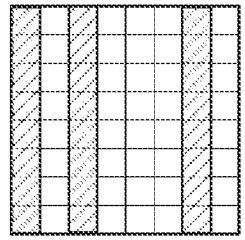

FIGS. 14*b* to *d* show some examples of structured sparsity applied to sets of coefficients in accordance with the principles described herein. The set of coefficients shown in FIGS. 14*b* to *d* may be used by a fully connected layer. In FIGS. 14*b* to *d*, coefficient channels are depicted as horizontal rows of the set of coefficients and filters of coefficients are depicted as vertical columns of the set of coefficients. In FIGS. 14*b* to *d*, sparse coefficients are shown using hatching. In each of FIGS. 14*b* to *d*, sparsity has been applied to groups of coefficients as described herein. In FIG. 14*b*, each group comprises a 2×2 tensor of coefficients. In FIG. 14*c*, each group comprises a channel of coefficients. In FIG. 14*d*, each group comprises a filter of coefficients.

Compression logic 404 is configured to compress the updated set of coefficients, $w'_j$, according to a compression scheme aligned with the groups of coefficients so as to represent each group of coefficients by an integer number of one or more compressed values. This is method step 604 in FIG. 6.

The compression scheme may be the SPGC8 compression scheme. As described herein with reference to FIG. 3*a*, the SPGC8 compression scheme compresses sets of coefficients by compressing a plurality of subsets of those coefficients. Each group of coefficients to which sparsity is applied by the pruner logic 402 may comprise one or more subsets of coefficients of the set of coefficients according to the compression scheme. For example, each group may comprise n coefficients and each subset according to the compression scheme may comprise m coefficients, where m is greater than 1 and n is an integer multiple of m. In some examples, n is equal to m. That is, in some examples each group of coefficients is a subset of coefficients according to the compression scheme. In other examples, n may be greater than m. In these examples, each group of coefficients may be compressed by compressing multiple adjacent or interleaved subsets of coefficients. For example, n may be equal to 2m. Each group may comprise 16 coefficients and each subset may comprise 8 coefficients. In this way, each group can be compressed by compressing two adjacent subsets of coefficients. Alternatively, each group can be compressed by compressing two interleaved subsets of coefficients as described herein.

It is to be understood that n need not be an integer multiple of the number of coefficients in a set of coefficients. In the case where n is not a multiple of the number of coefficients in a set of coefficients, the remaining coefficients once the set of coefficients has been divided into groups of n coefficients can be padded with zero coefficients (e.g. "zero padded") so as to form a final (e.g. remainder) group of n coefficients to be compressed according to the compression scheme.

The output of compression logic 404 may be stored in memory (such as memory 104 shown in FIG. 4) for subsequent use in a neural network. For example, the sets of coefficients may be compressed as described with reference to FIGS. 5 and 6 in an 'offline phase' (e.g. at 'design time'), before being stored for subsequent use in a 'runtime' implementation of a neural network. For example, the compressed sets of coefficients output by compression logic 404 in FIG. 5 may form an input for a neural network (e.g. an input 101 to the implementation of a neural network as shown in FIG. 1).

Figure 3B:
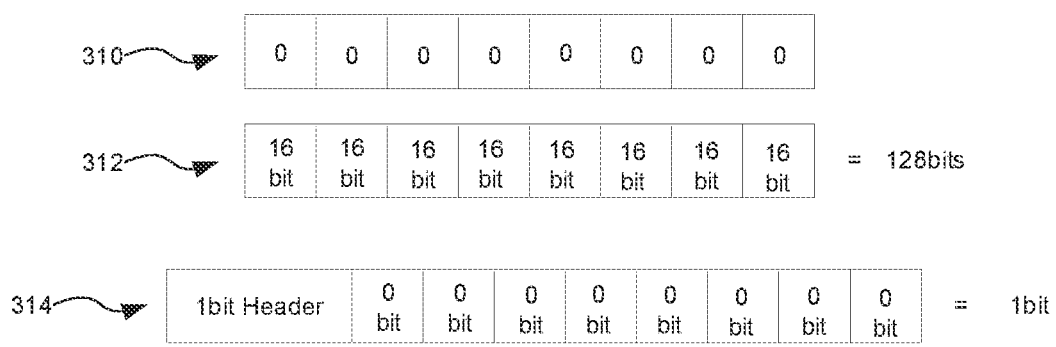
FIG. 3b illustrates the compression of a sparse subset of coefficients in accordance with a compression scheme.

The advantage of compressing groups of coefficients according to a compression scheme aligned with the groups of coefficients to which sparsity has been applied can be understood with reference to FIG. 3*b*.

FIG. 3*b* illustrates the compression of a sparse subset of coefficients in accordance with a compression scheme. The compression scheme may be the SPGC8 compression scheme as described herein. Here we consider a sparse subset of coefficients 310, where all eight coefficients in the subset have the value 0 (e.g. as a result of applying sparsity to a group of coefficients comprising that subset of coefficients). As described herein, typically, in uncompressed form, each coefficient may be encoded in a 16-bit binary number—as shown at 312—although more or fewer bits may be selected. Thus, in this example, 128 bits are required to encode a sparse subset of eight zero coefficients, as shown in 312. As described herein, according to the SPGC8 compression scheme a compressed subset of coefficients can be represented by header data and a plurality of body portions. In sparse subset of coefficients 310, the largest coefficient value is 0, which can be encoded using 0 bits of data. Thus, in this example, the header data indicates that 0 bits are going to be used to encode each coefficient in the subset of coefficients. The header data itself has a bit cost—for example, 1 bit (e.g. as only 1 bit is required to encode the number 0 in binary—the number of bits each body portion will comprise)—whilst each body portion encodes the coefficient values using 0 bits. In this example, the subset of coefficients 310 can therefore be encoded in a compressed form using 1 bit of data, as shown in 314, rather than in 128 bits in its uncompressed form, as shown in 312. Thus, compressing set of coefficients for subsequent use in a neural network in accordance with the principles described herein is greatly advantageous, as large compression ratios can be achieved, the memory footprint of the sets of coefficients can be significantly reduced, and the memory bandwidth required to read the sets of coefficients from memory can be significantly reduced. In addition, compressing set of coefficients for subsequent use in a neural network in accordance with the principles described herein significantly reduces the memory footprint of the model file/graph/representation of the neural network.

On the other hand, if sparsity were to be applied in an unstructured manner and even one of the coefficients in a subset of coefficients were to be non-zero, the compression scheme would use one or more bits to encode each coefficient value in that subset—thus, potentially significantly increasing the memory footprint of the compressed subset. For example, following the reasoning explained with reference to subset 302 with reference to FIG. 3a, a subset of coefficients 31, 0, 0, 0, 0, 0, 0, 0 would require 43 bits to be encoded (as the maximum value 31 requires 5 bits to be encoded and, so each body portion would be encoded using 5 bits). Hence, it is particularly advantageous to apply sparsity to groups of coefficients so as to cause the subsets of coefficients of those groups to be compressed to comprise exclusively '0' coefficient values.

It is to be understood that numerous other suitable compression schemes exist, and that the principles described herein are not limited to application with the SPGC8 compression scheme. For example, the principles described herein may be applicable with any compression scheme that compresses sets of coefficients by compressing a plurality of subsets of those sets of coefficients.

It is to be understood that the structured sparsity principles described herein are applicable to the sets of coefficients of convolutional layers, fully-connected layers and any other type of neural network layer configured to combine a set of coefficients of suitable format with data input to that layer Channel Pruning The logic units of data processing system 410 shown in FIG. 4 can be used in other ways so as to address one or more of the problems identified herein. For example, coefficient identification logic 412 can be used to perform channel pruning.

Figure 11A:
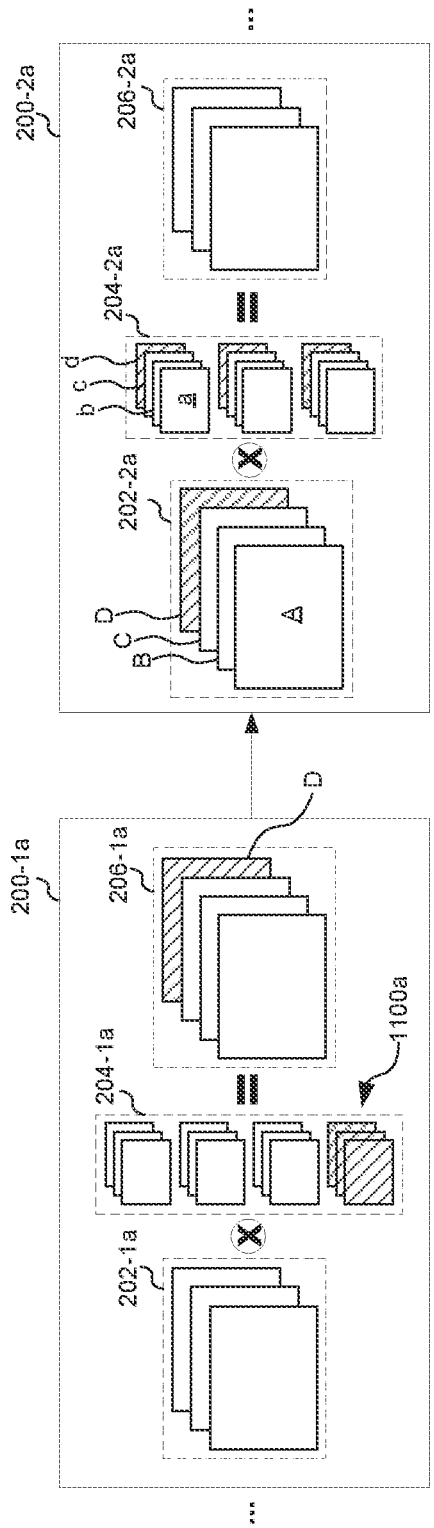
FIG. 11a shows an exemplary application of channel pruning in convolutional layers according to the principles described herein.

FIG. 11a shows an exemplary application of channel pruning in convolutional layers according to the principles described herein. FIG. 11a shows two convolutional layers, 200-1a and 200-2a. It is to be understood that a neural network may comprise any number of layers. The data input to layer 200-2a depends on the output data for the layer 200-1a—referred to herein as the "preceding layer". That is, the data input to layer 200-2a may be the data output from preceding layer 200-1a. Alternatively, further processing logic (such as element-wise addition, subtraction or multiplication logic—not shown) may exist between layers 200-1a and 200-2a, and perform an operation on output data 200-1a so as to provide input data 200-2a.

Each layer shown in FIG. 11a is configured to combine a respective set of filters with data input to the layer so as to form output data for the layer. For example, layer 200-2a is configured to combine a set of filters 204-2a with data 202-2a input to the layer so as to form output data 206-2a for the layer. Each filter of the set of filters of a layer may comprise a plurality of coefficients of the set of coefficients of that layer. Each filter in the set of filters of the layer may comprise a different plurality of coefficients. That is, each filter may comprise a unique set of coefficients of the set of coefficients. Alternatively, two or more of the filters in the set of filters of the layer may comprise the same plurality of coefficients. That is, two or more of the filters in a set of filters may be identical to each other.

The set of filters for each layer shown in FIG. 11a comprises a plurality of coefficient channels, each coefficient channel of the set of filters corresponding to a respective data channel in the data input to the layer. For example, input data 202-2a comprises four channels and each filter (e.g. each individual filter) in set of filters 204-2a comprises four coefficient channels. The first, or uppermost, filter of set of filters 204-2a comprises coefficient channels a, b, c and d, which correspond with channels A, B, C, D of input data 202-2a respectively. For simplicity, the coefficient channels of each of the other two filters in set of filters 204-2a are not labelled—although it will be appreciated that the same principles apply to those filters. Thus, the set of filters (e.g. as a collective) of a layer can be described as comprising a plurality of coefficient channels, each coefficient channel of the set of filters (e.g. as a collective) including the coefficient channel of each filter (e.g. each individual filter) of the set of filters that corresponds to the same data channel in the data input to that layer.

The output data for each layer shown in FIG. 11a comprises a plurality of data channels, each data channel corresponding to a respective filter of the set of filters of that layer. That is, each filter of the set of filters of a layer may be responsible for forming a data channel in the output data for that layer. For example, the set of filters 204-2a of layer 200-2a comprises three filters and the output data 206-2a for that layer comprises three data channels. Each of the three filters in set of filters 204-2a may correspond with (e.g. and be responsible for forming) a respective one of the data channels in output data 206-2a.

Figure 12:
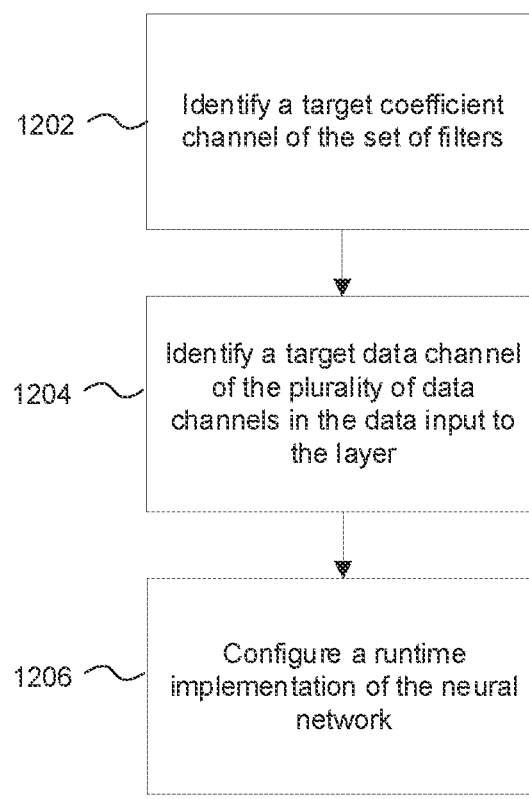
FIG. 12 shows a method of training a neural network using channel pruning in accordance with the principles described herein.

FIG. 12 shows a method of training a neural network using channel pruning in accordance with the principles described herein.

In step 1202, a target coefficient channel of the set of filters of a layer is identified. This step is performed by coefficient identification logic 412 as shown in FIG. 4. For example, in FIG. 11a, an identified target coefficient channel of set of filters 204-2a is shown in hatching. The target coefficient channel includes coefficient channel d of the first, or uppermost, filter of set of filters 204-2a, and the coefficient channels in the other two filters of set of filters 204-2a that correspond with the same data channel in input data 202-2a. FIG. 11a illustrates the identification of one target coefficient channel in set of filters 204-2a—although it is to be understood that any number of target coefficient channels may be identified in a set of filters in step 1202.

The target coefficient channel may be identified in accordance with a sparsity parameter. For example, the sparsity parameter may indicate a percentage of sparsity to be applied to the set of filters 204-2a—e.g. 25%. The coefficient identification logic 412 may identify that 25% sparsity could be achieved in the set of filters 204-2a by applying sparsity to the hatched coefficient channel. The target coefficient channel may be the least salient coefficient channel in the set of filters. The coefficient channel may use logic similar to that described with reference to pruner logic 402b or 402d shown in FIGS. 7b and 7d respectively so as to identify one or more least salient coefficient channels in the set of filters. For example, the coefficient identification logic may comprise the same arrangement of logical units as either pruner logic 702*b* or 702*d* shown in FIGS. 7*b* and 7*d* respectively, other than the multiplication logic 714, so as to provide a binary mask in which the target channel is identified by binary '0's. Alternatively, coefficient identification logic 412 may cause the set of filters to be processed using pruner logic 402*b* or 402*d* itself so as to identify the target coefficient channel. It is to be understood that, in the channel pruning examples described herein, sparsity may, or may not, actually be applied to said target coefficient channel. For example, coefficient identification logic may identify, flag, or determine the target coefficient channel in accordance with a sparsity parameter for use in steps 1204 and 1206 without actually applying sparsity to the target coefficient channel. Alternatively, sparsity may be applied to the target coefficient channel in a test implementation of a neural network so as to determine how removing that coefficient channel would affect the accuracy of the network, before performing steps 1204 and 1206—as will be described in further detail herein.

In step 1204, a target data channel of the plurality of data channels in the data input to the layer is identified. This step is performed by coefficient identification logic 412 as shown in FIG. 4. The target data channel is the data channel corresponding to the target coefficient channel of the set of filters. For example, in FIG. 11*a*, the identified target data channel in the input data 202-2*a* is data channel D, and is shown in hatching.

Steps 1202 and 1204 may be performed by coefficient identification logic 412 in an "offline", "training" or "design" phase. The coefficient identification logic 412 may report the identified target coefficient channel and the identified target data channel to the data processing system 410. In step 1206, a runtime implementation of the neural network is configured in which the set of filters of the preceding layer do not comprise that filter which corresponds to the target data channel. As such, when executing the runtime implementation of the neural network on the data processing system, combining the set of filters of the preceding layer with data input to the preceding layer does not form the data channel in the output data for the preceding layer corresponding to the target data channel. Step 1206 may be performed by the data processing system 410 itself configuring the software and/or hardware implementations of the neural network 102-1 or 102-2 respectively. Step 1206 may further comprise storing the set of filters of the preceding layer that do not comprise that filter which corresponds to the target data channel in memory (e.g. memory 102 shown in FIG. 4) for subsequent use by the runtime implementation of the neural network. Step 1206 may further comprise configuring the runtime implementation of the neural network in which each filter of the set of filters of the layer does not comprise the target coefficient channel. Step 1206 may further comprise storing the set of filters of the layer that do not comprise the target coefficient channel in memory (e.g. memory 102 shown in FIG. 4) for subsequent use by the runtime implementation of the neural network.

For example, in FIG. 11*a*, the filter 1100*a* (shown in hatching) in set of filters 204-1*a* of the preceding layer 200-1*a* corresponds to the identified target data channel (e.g. data channel D in input data 204-2*a*). This is because, as described herein, each of the filters in the set of filters of a layer may be responsible for forming a respective one of the data channels in output data for that layer. The data input to layer 200-2*a* depends on the output data for the preceding layer 200-1*a*. Thus, in FIG. 11*a*, filter 1100*a* is responsible for forming data channel D in output data 206-1*a*. Data channel D in input data 202-2*a* depends on data channel D in output data 206-1*a*. In this way, filter 1100*a* corresponds with data channel D in input data 202-2*a*. By configuring a runtime implementation of the neural network in which the set of filters of the preceding layer 200-1*a* do not comprise filter 1100*a*, when executing the runtime implementation of the neural network on the data processing system, the data channel D in output data 206-1*a* will not be formed. Thus, the input data 202-2*a* will not comprise data channel D. As a result, the target coefficient channel shown in hatching may also be omitted from the set of filters in 204-2*a* when configuring the runtime implementation of the neural network. Alternatively, the target coefficient channel may be included in the set of filters in 204-2*a*, but, when executing the runtime implementation of the neural network on the data processing system, any computations involving the coefficients in the target coefficient channel may be bypassed.

As described herein, FIG. 11*a* shows an exemplary application of channel pruning in convolutional layers. That said, sets of coefficients used by other types of neural network layer, such as fully-connected layers, can also be arranged as a set of filters as described herein. Thus, it is to be understood that the principles described herein are applicable to the sets of coefficients of convolutional layers, fully-connected layers and any other type of neural network layer configured to combine a set of coefficients of suitable format with data input to that layer.

Figure 11B:
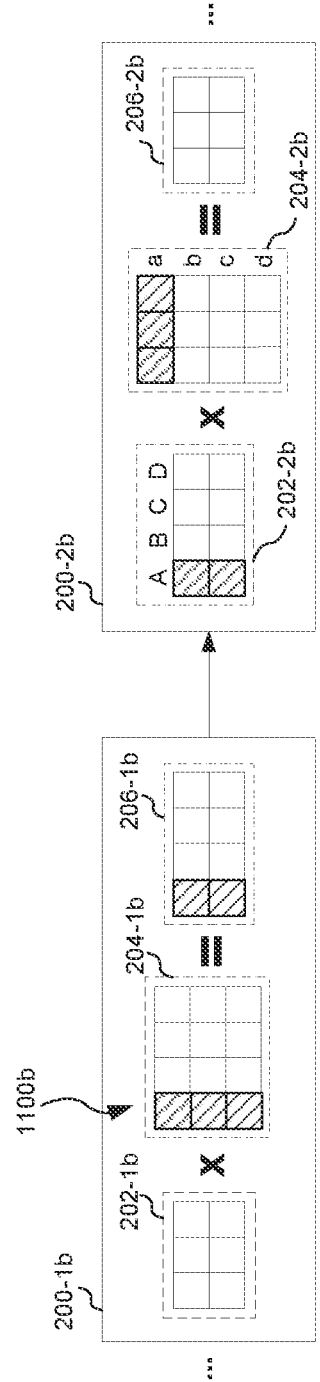
FIG. 11b shows an exemplary application of channel pruning in fully-connected layers according to the principles described herein.

For example, FIG. 11*b* shows an exemplary application of channel pruning in fully-connected layers according to the principles described herein. FIG. 11*b* shows two fully-connected layers, 200-1*b* and 200-2*b*. It is to be understood that a neural network may comprise any number of layers. The data input to layer 200-2*b* depends on the output data for the layer 200-1*b*—referred to herein as the "preceding layer". That is, the data input to layer 200-2*b* may be the data output from preceding layer 200-1*b*. Alternatively, further processing logic (such as element-wise addition, subtraction or multiplication logic—not shown) may exist between layers 200-1*b* and 200-2*b* that performs an operation on output data 200-1*b* so as to provide input data 200-2*b*.

Each layer shown in FIG. 11*b* is configured to combine a respective set of filters with data input to the layer so as to form output data for the layer. For example, layer 200-2*b* is configured to combine set of filters 204-2*b* with data 202-2*b* input to the layer so as to form output data 206-2*b* for the layer. In FIG. 11*b*, individual filters are depicted as vertical columns of the set of filters. That is, set of filters 204-2*b* comprises three filters. Each filter of the set of filters of a layer may comprise a plurality of coefficients of the set of coefficients of that layer. Each filter in the set of filters of the layer may comprise a different plurality of coefficients. That is, each filter may comprise a unique set of coefficients of the set of coefficients. Alternatively, two or more of the filters in the set of filters of the layer may comprise the same plurality of coefficients. That is, two or more of the filters in a set of filters may be identical to each other.

The set of filters for each layer shown in FIG. 11*b* comprises a plurality of coefficient channels, each coefficient channel of the set of filters corresponding to a respective data channel in the data input to the layer. In FIG. 11*b*, coefficient channels are depicted as horizontal rows of the set of filters. That is, set of filters 204-2*b* comprises four coefficient channels. In FIG. 11*b*, data channels are depicted as vertical columns of the set of input and output data. That is, input data 202-2*b* comprises four coefficient channels. In FIG. 11*b*, the set of filters 204-2*b* comprises coefficient channels a, b, c and d, which correspond with channels A, B, C, D of input data 202-2b respectively.

The output data for each layer shown in FIG. 11b comprises a plurality of data channels, each data channel corresponding to a respective filter of the set of filters of that layer. That is, each filter of the set of filters of a layer may be responsible for forming a data channel in the output data for that layer. For example, the set of filters 204-2b of layer 200-2a comprises three filters (shown as vertical columns) and the output data 206-2b for that layer comprises three data channels (shown as vertical columns. Each of the three filters in set of filters 204-2b may correspond with (e.g. and be responsible for forming) a respective one of the data channels in output data 206-2b.

Referring again to FIG. 12, in step 1202, a target coefficient channel of the set of filters of a layer is identified as described herein. For example, in FIG. 11b, an identified target coefficient channel of set of filters 204-2b is coefficient channel a, and is shown in hatching. In step 1204, a target data channel of the plurality of data channels in the data input to the layer is identified as described herein. For example, in FIG. 11b, the identified target data channel in the input data 202-2b is data channel A, and is shown in hatching. In step 1206, a runtime implementation of the neural network is configured in which the set of filters of the preceding layer do not comprise that filter which corresponds to the target data channel as described herein. For example, in FIG. 11b, the filter 1100b (shown in hatching) in set of filters 204-1b of the preceding layer 200-1a corresponds to the identified target data channel (e.g. data channel A in input data 204-2b).

Two different bandwidth requirements affecting the performance of a neural network are weight bandwidth and activation bandwidth. The weight bandwidth relates to the bandwidth required to read weights from memory. The activation bandwidth relates to the bandwidth required to read the input data for a layer from memory, and write the corresponding output data for that layer back to memory. By performing channel pruning, both the weight bandwidth and the activation bandwidth can be reduced. The weight bandwidth is reduced because, with fewer filters of a layer (e.g. where one or more filters of a set of filters is omitted when configuring the runtime implementation of the neural network) and/or smaller filters of a layer (e.g. where one or more coefficient channels of a set of filters is omitted when configuring the runtime implementation of the neural network), the number of coefficients in the set of coefficients for that layer is reduced—and thus fewer coefficients are read from memory whist executing the runtime implementation of the neural network. For the same reasons, channel pruning also reduces the total memory footprint of the sets of coefficients for use in a neural network (e.g. when stored in memory 104 as shown in FIGS. 1 and 4). The activation bandwidth is reduced because, with fewer filters in a layer (e.g. where one or more filters of a set of filters is omitted when configuring the runtime implementation of the neural network), the number of channels in the output for that layer is reduced. This means that less output data is written to memory, and less input data for the subsequent layer is read from memory. Channel pruning also reduces the computational requirements of a neural network by reducing the number of operations to be performed (e.g. multiplications between coefficients and respective input data values).

Learnable Sparsity Parameter

Figure 9:
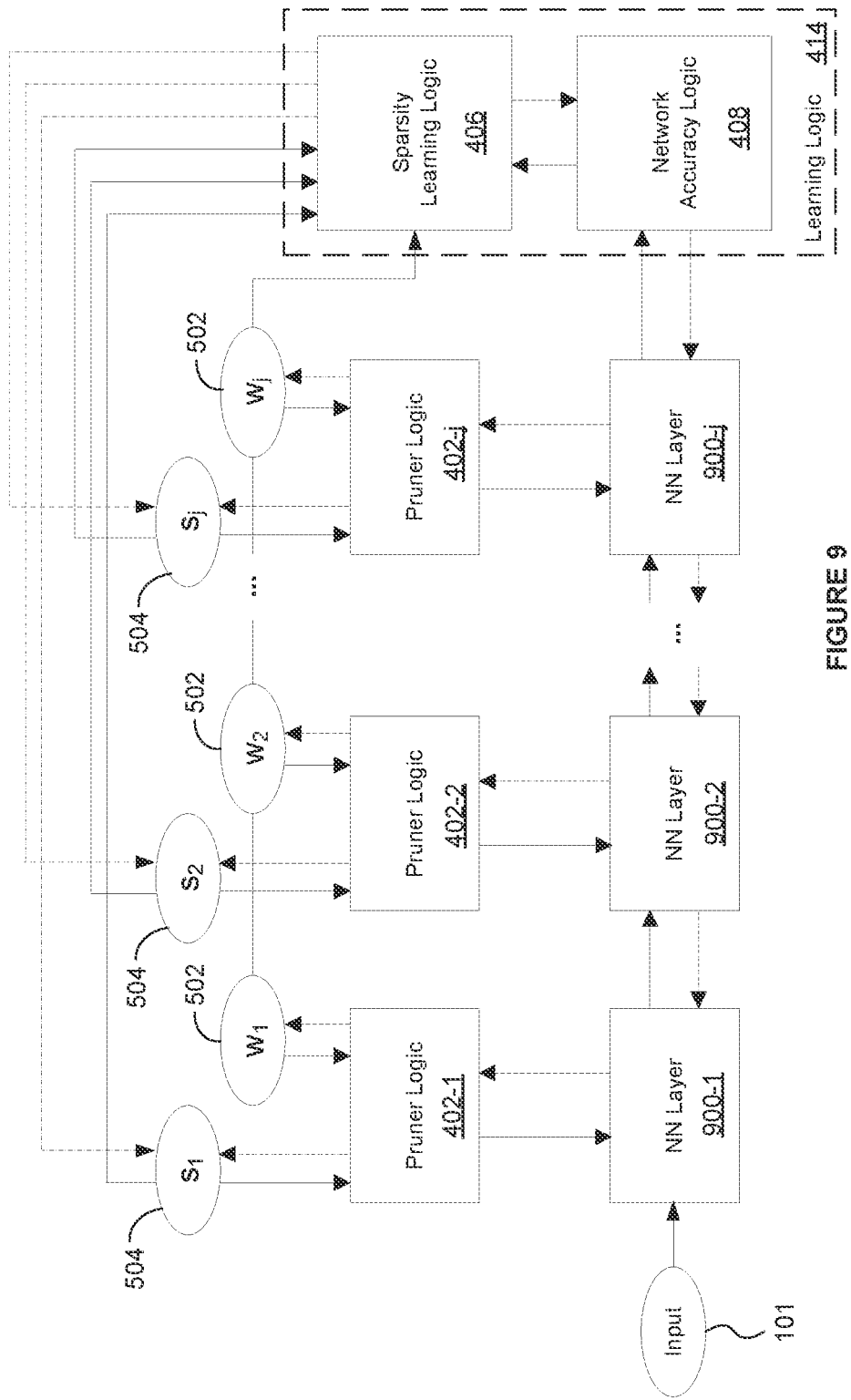
FIG. 9 shows a data processing system implementing a test implementation of a neural network for learning a sparsity parameter by training in accordance with the principles described herein.

Approaches to "unstructured sparsity", "structured sparsity" and "channel pruning" have been described herein. In each of these approaches, reference has been made to a sparsity parameter. As described herein, the sparsity parameter may be set (e.g. somewhat arbitrarily by a user) in dependence on an assumption of what proportion of the coefficients in a set of coefficients can be set to zero, or removed, without significantly affecting the accuracy of the neural network. That said, further advantages can be gained in each of the described "sparsity", "structured sparsity" and "channel pruning" approaches by learning a value for the sparsity parameter, for example, an optimal value for the sparsity parameter. As described herein, the sparsity parameter can be learned, or trained, as part of the training process for a neural network. This can be achieved by logically arranging pruner logic 402, network accuracy logic 408, and sparsity learning logic 406 of FIG. 4, as shown in FIG. 9. Network accuracy logic 408 and sparsity learning logic 406 can be referred to collectively as learning logic 414.

FIG. 9 shows a data processing system implementing a test implementation of a neural network for learning a sparsity parameter by training in accordance with the principles described herein. The test implementation of the neural network shown in FIG. 9 comprises three neural network layers 900-1, 900-2, and 900-j. Neural network layers 900-1, 900-2, and 900-j can be implemented in hardware, software, or any combination thereof (e.g. in software implementation of a neural network 102-1 and/or hardware implementation of a neural network 102-2 as shown in FIG. 4). Although three neural network layers are shown in FIG. 9, it is to be understood that the test implementation of the neural network may comprise any number of layers. The test implementation of the neural network may include one or more convolutional layer, one or more fully-connected layer, and/or one or more of any other type of neural network layer configured to combine a set of coefficients with respective data values input to that layer. That is, it is to be understood that the learnable sparsity parameter principles described herein are applicable to the sets of coefficients of convolutional layers, fully-connected layers and any other type of neural network layer configured to combine a set of coefficients of suitable format with data input to that layer. It is to be understood that the test implementation of the neural network may also comprise other types of layers (not shown) that are not configured to combine sets of coefficients with data input to those layers, such as activation layers and element-wise layers.

The test implementation of the neural network also includes three instances of pruner logic 402-1, 402-2, and 402-j, each of which receive as inputs a respective set of coefficients, $w_1$, $w_2$, $w_j$, and a respective sparsity parameter, $s_1$, $s_2$, $s_j$, for the respective neural network layer 900-1, 900-2, and 900-j. As described herein, the set of coefficients may be in any suitable format. The sparsity parameter may indicate a level of sparsity to be applied to the set of coefficients by the pruner logic. For example, the sparsity parameter may indicate a percentage, fraction, or portion of the set of coefficients to which sparsity is to be applied by the pruner logic.

The pruner logic shown in FIG. 9 may have the same features as any of pruner logic 402a, 402b, 402c or 402d as described with reference to FIGS. 7a, 7b, 7c and 7d respectively. The type of pruner logic used in the test implementation of the neural network may depend on the approach for which the sparsity parameter is being trained (e.g. "unstructured sparsity", "structured sparsity" or "channel pruning") and/or the distribution of the set of coefficients received by the pruner logic (e.g. whether that set of coefficients is, or is approximately, normally distributed). For example, if the test implementation of the neural network shown in FIG. 9 is being used to learn a sparsity parameter for the application of structured sparsity to a normally distributed set of coefficients, instances of pruner logic 402-1, 402-2, and 402-$j$ may have the same features as pruner logic 702$d$ described with reference to FIG. 7$d$.

The test implementation of the neural network shown in FIG. 9 also comprises network accuracy logic 408, which is configured to assess the accuracy of the test implementation of the neural network, and sparsity learning logic 406 configured to update one or more of the sparsity parameters, $s_1$, $s_2$, $s_j$, in dependence on the accuracy of the network—as will be described in further detail herein.

Figure 10:
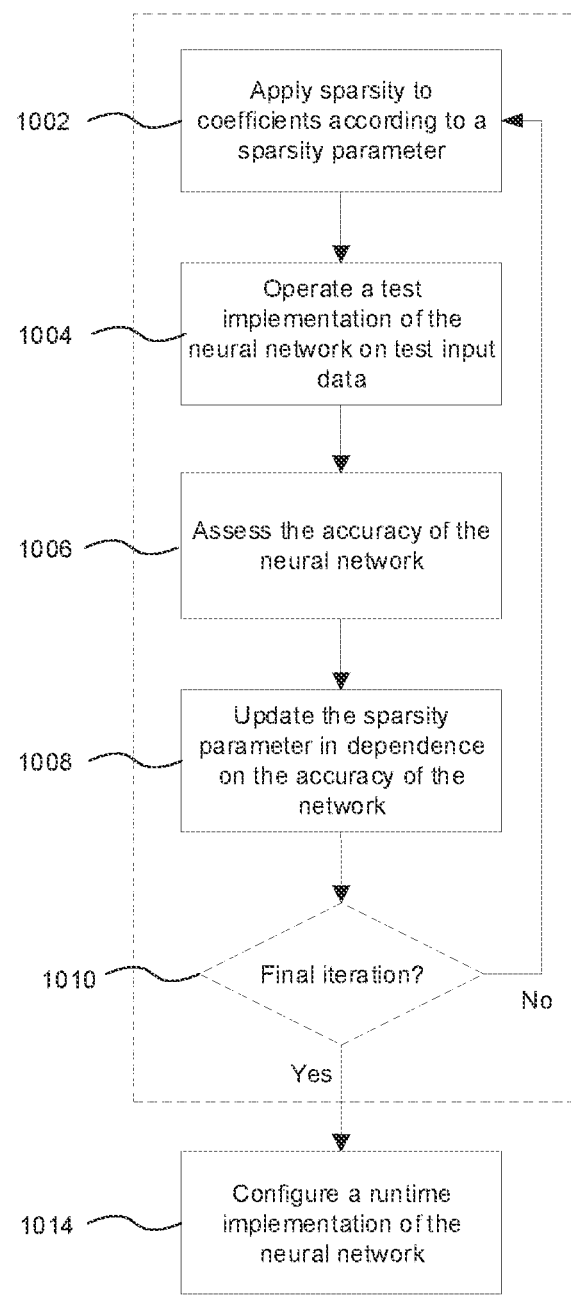
FIG. 10 shows a method of learning a sparsity parameter by training a neural network in accordance with the principles described herein.

FIG. 10 shows a method of learning a sparsity parameter by training a neural network in accordance with the principles described herein. Steps 1002, 1004, 1006, 1008, and 1010 of FIG. 10 may be performed using the test implementation of the neural network shown in FIG. 9. In the following description, the method of learning sparsity is described with reference to neural network layer 900-$j$. It is to be understood that the same method may be performed simultaneously, or sequentially, for each of the other layers of the test implementation of the neural network.

In step 1002, sparsity is applied to one or more of the coefficients of set of coefficients, $w_j$, according to a sparsity parameter, $s_j$. This step is performed by pruner logic 402-$j$. This may be achieved by applying a sparsity algorithm to the set of coefficients. Sparsity can be applied by pruner logic 402-$j$ in the manner described herein with reference to the "unstructured sparsity", "structured sparsity" or "channel pruning" approaches.

In step 1004, the test implementation of the neural network is operated on training input data using the set of coefficients output by pruner logic 402-$j$ so as to form training output data. This step can be described as a forward pass. The forward pass is shown by solid arrows in FIG. 9. For example, in FIG. 9, neural network layer 900-$j$ combines the set of coefficients output by pruner logic 402-$j$ with data input into that layer so as to form output data for that layer. In the example shown in FIG. 9, the output data for the final layer in the sequence of layers (e.g. layer 900-$j$) is to be the training output data.

In step 1006, the accuracy of the neural network is assessed in dependence on the training output data. This step is performed by network accuracy logic 408. The accuracy of the neural network may be assessed by comparing the training output data to verified output data for the training input data. The verified output data may be formed prior to applying sparsity in step 1002 by operating the test implementation of the neural network on the training input data using the original set of coefficients (e.g. the set of coefficients before sparsity was artificially applied in step 1002). In another example, verified output data may be provided with the training input data. For example, in image classification applications where the training input data comprises a number of images, the verified output data may comprise a predetermined class or set of classes for each of those images. In one example, step 1006 comprises assessing the accuracy of the neural network using a cross-entropy loss equation that depends on the training output data (e.g. the training output data formed in dependence on the set of coefficients output by pruner logic 402-$j$, in which sparsity has been applied to one or more of the coefficients of set of coefficients, $w_j$, according to the sparsity parameter, $s_j$) and the verified output data. For example, the accuracy of the neural network may be assessed by determining a loss of the training output data using the cross-entropy loss function.

In step 1008, the sparsity parameter $s_j$ is updated in dependence on the accuracy of the neural network as assessed in step 1006. This step is performed by sparsity learning logic 406. This step can be described as a backward pass of the network. Step 1008 may comprise updating the sparsity parameter $s_j$ in dependence on a parameter optimisation technique configured to balance the level of sparsity to be applied to the set to coefficients $w_j$ as indicated by the sparsity parameter $s_j$ against the accuracy of the network. That is, in the examples described herein, the sparsity parameter for a layer is a learnable parameter that can be updated in an equivalent manner to the set of coefficients for that layer. In one example, the parameter optimisation technique uses a cross-entropy loss equation that depends on the sparsity parameter and the accuracy of the network. For example, the sparsity parameter $s_j$ can be updated in dependence on the loss of the training output data determined using the cross-entropy loss function by back-propagation and gradient descent. Back-propagation can be considered to be a process of calculating a gradient for the sparsity parameter with respect to the cross-entropy loss function. This can be achieved by using chain rule starting at the final output of the cross-entropy loss function and working backwards to the sparsity parameter Once the gradient is known, a gradient descent (or its derivative) algorithm can be used to update the sparsity parameter according to its gradient calculated through back-propagation. Gradient descent can be performed in dependence on a learning rate parameter, which indicates the degree to which the sparsity parameter can be changed in dependence on the gradient at each iteration of the training process.

Step 1008 may be performed in dependence on a weighting value configured to bias the test implementation of the neural network towards maintaining the accuracy of the network or increasing the level of sparsity applied to the set to coefficients as indicated by the sparsity parameter. The weighting value may be a factor in the cross-entropy loss equation. The weighting value may be set by a user of the data processing system. For example, the weighting value may be set in dependence on the memory and/or processing resources available on the data processing system on which the runtime implementation of the neural network is to be executed. For example, if the memory and/or processing resources available on the data processing system on which the runtime implementation of the neural network is to be executed are relatively small, the weighting value may be used to bias the method towards increasing the level of sparsity applied to the set to coefficients as indicated by the sparsity parameter.

Step 1008 may be performed in dependence on a defined maximum level of sparsity to be indicated by the updated sparsity parameter. The defined maximum level of sparsity may be a factor in the cross-entropy loss equation. The maximum level of sparsity may be set by a user of the data processing system. For example, if the memory and/or processing resources available on the data processing system on which the runtime implementation of the neural network is to be executed are relatively small, the defined maximum level of sparsity to be indicated by the updated sparsity parameter may be set to a relatively high maximum level—so as to permit the method to increase the level of sparsity applied to the set to coefficients as indicated by the sparsity parameter to a relatively high level.

As described herein, the test implementation of the neural network may comprise a plurality of layers, each layer configured to combine a respective set of coefficients with respective input data values to that layer so as to form an output for that layer. The number of coefficients in the set of coefficients for each layer of the plurality of layers may be variable between layers. In step 1008, a respective sparsity parameter may be updated for each layer of the plurality of layers. In these examples, step 1008 may further comprise updating the sparsity parameter for each layer of the plurality of layers in dependence on the number of coefficients in the set of coefficients for each layer, such that the test implementation of the neural network is biased towards updating the respective sparsity parameters so as to indicate a greater level of sparsity to be applied to sets of coefficients comprising a larger number of coefficients relative to sets of coefficients comprising fewer coefficients. This is because sets of coefficients comprising great numbers of coefficients typically comprises a greater proportion of redundant coefficients. This means that larger set of coefficients may be able to be subjected to larger levels of applied sparsity before the accuracy of the network is significantly affected, relative to sets of coefficients comprising fewer coefficients.

In one specific example, steps 1006 and 1008 may be performed using a cross-entropy loss equation as defined by Equation (11).

$$\arg\min_{w,s} \frac{1}{I}\left(\sum_{i=1}^{I}[\mathcal{L}_{ce}(f(x_i, W, s), y_i) + \mathcal{L}_{sp}(f(x_i, W, s), y_i)]\right) + \lambda\|W\|_1 \quad (11)$$

In Equation (11), $\{(x_i, y_i)\}_{i=1}^{I}$ represents a training input data set $\mathcal{U}$ with I pairs of input images $x_i$ and verified output labels $y_i$. The test implementation of the neural network, executing a neural network model f, addresses the problem of mapping inputs to target labels. $W=\{w_j\}_{j=1}^{J}$ represents the sets of coefficients $w_j$ for J layers, and $s=\{s_j^\sigma\}_{j=1}^{J}$ represents the sparsity parameters $s_j^\sigma$ for J layers. $\mathcal{L}_{ce}(f(x_i, W, s), y_i)$ is the cross-entropy loss defined by Equation (12) where k defines the index of each class probability output, $\lambda\|w\|_1$ is an L1 regularisation term, and $\mathcal{L}_{sp}(f(x_i, W, s), y_i)$ is cross-entropy coupled sparsity loss defined by Equation (13).

$$\mathcal{L}_{ce}(f(x_i,W,s),y_i) = -\Sigma_k K y_i^k \log(f^k(x_i,W,s)) \quad (12)$$

$$\mathcal{L}_{sp}(f(x_i,W,s),y_i) = -\alpha \mathcal{L}_{ce}(f(x_i,W,s),y_i)\log(1-c(W,s)) - (1-\alpha)\log(c(W,s)) \quad (13)$$

The processes of back propagation and gradient performed in step 1008 may involve working towards or finding a local minimum in a loss function, such as shown in Equation (12). The sparsity learning logic 406 can assess the gradient of the loss function for the set of coefficients and sparsity parameter used in the forward pass so as to determine how the sets of coefficients and/or sparsity parameter should be updated so as to move towards a local minimum of the loss function. For example, in Equation (13), minimising the term $-\log(1-c(W,s))$ may find new values for the sparsity parameters of each layer of the plurality of layers that indicate an overall decreased level of sparsity to be applied to the sets to coefficients of the neural network. Minimising the term $-\log(c(W,s))$ may find new values for the sparsity parameters of each layer of the plurality of layers that indicate an overall increased level of sparsity to be applied to the sets to coefficients of the neural network.

In Equation (13), a is a weighting value configured to bias towards maintaining the accuracy of the network or increasing the level of sparsity applied to the set to coefficients as indicated by the sparsity parameter. The weighing value, a, may take a value between 0 and 1. Lower values of a (e.g. relatively closer to 0) may bias towards increasing the level of sparsity applied to the set to coefficients as indicated by the sparsity parameter (e.g. potentially to the detriment of network accuracy). Higher values of a (e.g. relatively closer to 1) may bias towards maintaining the accuracy of the network.

In Equation (13), c(W,s), defined by Equation (14) below, is a function for updating the sparsity parameter in dependence on the number of coefficients in the set of coefficients for each layer of the plurality of layers such that step 1008 is biased towards updating the respective sparsity parameters so as to indicate a greater level of sparsity to be applied to sets of coefficients comprising a larger number of coefficients relative to sets of coefficients comprising fewer coefficients.

$$c(W, s) = \frac{\sum_{j=1}^{J} s_j^\sigma |w_j|}{\sum_{j=1}^{J} |w_j|} \quad (14)$$

In a variation, Equation (13) can be modified so as to introduce a defined maximum level of sparsity, θ, to be indicated by the updated sparsity parameter. This variation is shown in Equation (15).

$$\mathcal{L}_{sp}(f(x_i, W, s), y_i, \theta) = \\ -\alpha\mathcal{L}_{ce}(f(x_i, W, s), y_i)\log\left(1 - \frac{c(W, s)}{\theta}\right) - (1-\alpha)\log\left(\frac{c(W, s)}{\theta}\right) \quad (15)$$

The maximum level of sparsity, θ, to be indicated by the updated sparsity parameter may represent a maximum percentage, fraction, or portion of the set of coefficients to which sparsity is to be applied by the pruner logic. As with the sparsity parameter, the maximum level of sparsity, θ, may take a value between 0 and 1. For example, a maximum level of sparsity, θ, of 0.7 may define that no more than 70% sparsity is to be indicated by the updated sparsity parameter.

Returning to FIG. 9, in examples where the test implementation of the neural network comprises pruner logic using non-differentiable quantile methodology (e.g. the pruner logic 702a or 702b described with reference to FIGS. 7a and 7b respectively), the sparsity parameter $s_j$, may be updated in step 1008 directly by the sparsity learning logic 406 (shown by a dot-and-dashed line in FIG. 9 between sparsity learning logic 406 and the sparsity parameter $s_j$). In examples where the test implementation of the neural network comprises pruner logic using a differentiable quantile function (e.g. the pruner logic 702c or 702d described with reference to FIGS. 7c and 7d respectively), the sparsity parameter $s_j$ may be updated in step 1008 by back propagating the one or more gradients output by sparsity learning logic 406 through the network accuracy logic 408, the neural network layer 900-j and the pruner logic 402-j (shown in FIG. 9 by dashed lines). That is, when applying sparsity in step 1002 comprises modelling the set of coefficients using a differentiable function so as to identify a threshold value in dependence on the sparsity parameter, and applying sparsity in dependence on that threshold value, the sparsity parameter can be updated in step 1008 by modifying the threshold value by backpropagating one or more gradient vectors using the differentiable function.

In combined learnable sparsity parameter and channel pruning approaches, a sparsity parameter may first be trained using the learnable sparsity parameter approach described herein. The sparsity parameter may be trained for channel pruning by configuring the pruner logic to apply sparsity to coefficient channels (e.g. using pruner logic as described with reference to FIG. 7b or 7d, where each coefficient channel is treated as a group of coefficients). Thereafter, one or more target data channels can be identified in dependence on the trained sparsity parameter, and the following steps of the channel pruning method performed (as can be understood with reference to the description of FIGS. 11a, 11b and 12).

Steps 1002, 1004, 1006 and 1008 may be performed once. This may be termed "one-shot pruning". Alternatively, steps 1002, 1004, 1006 and 1008 can be performed iteratively. That is, in a first iteration, sparsity can be applied in step 1002 in accordance with the original sparsity parameter. In each subsequent iteration, sparsity can be applied in step 1002 in accordance with the sparsity parameter as updated in step 1008 of the previous iteration. The sets of coefficients may also be updated by back propagation and gradient descent in step 1008 of each iteration. In step 1010, it is determined whether the final iteration of steps 1002, 1004, 1006 and 1008 has been performed. If not, a further iteration of steps 1002, 1004, 1006 and 1008 is performed. A fixed number of iterations may be performed. Alternatively, the test implementation of the neural network may be configured to iteratively perform steps 1002, 1004, 1006 and 1008 until a condition has been met. For example, until a target level of sparsity in the sets of coefficients for the neural network has been met. When it is determined in step 1010 that the final iteration has been performed, the method progresses to step 1014.

In step 1014, a runtime implementation of the neural network is configured in dependence on the updated sparsity parameter. When using the "unstructured sparsity" and "structured sparsity" approaches described herein, step 1014 may comprise using pruner logic (e.g. pruner logic 402 shown in FIG. 4) to apply sparsity to the sets of coefficients (e.g. the most recently updated set of coefficients) using the updated sparsity parameter so as to provide a sparse set of coefficients. Sparsity should be applied at this stage using the same approach, e.g. "unstructured sparsity" or "structured sparsity", as was used to update the sparsity parameter during the training process. The sparse set of coefficients may be written to memory (e.g. memory 104 in FIG. 4) for subsequent use by a runtime implementation of the neural network. That is, the sparsity parameter and sets of coefficients may be trained as described with reference to steps 1002, 1004, 1006, 1008 and 1010 of FIG. 10 in an 'offline phase' (e.g. at 'design time'). Sparsity can then be applied to the trained sets of coefficients in accordance with the trained sparsity parameter so as to provide a trained, sparse, set of coefficients that are stored for subsequent use in a run-time implementation of a neural network. For example, trained, sparse, set of coefficients may form an input for neural network (e.g. an input 101 to the implementation of a neural network as shown in FIG. 1). The runtime implementation of the neural network may be implemented by the data processing system 410 in FIG. 4 configuring the software and/or hardware implementations of the neural network 102-1 or 102-2 respectively.

When using the "channel pruning" approaches described herein, step 1014 may comprise using coefficient identification logic 412 to identify one or more target coefficient channels in accordance with the updated sparsity parameter, before configuring the runtime implementation of the neural network as described herein with reference to FIG. 12.

Learning, or training, the sparsity parameter as part of the training process for a neural network is advantageous as the sparsity to be applied to the set of coefficients of each of a plurality of layers of a neural network can be optimised so as to maximise sparsity where network accuracy is not affected, whilst preserving the density of the sets of coefficients where the network is sensitive to sparsity.

The implementation of a neural network shown in FIG. 1, the data processing systems of FIGS. 4, 5 and 9 and the logic shown in FIGS. 7a, 7b, 7c and 7d are shown as comprising a number of functional blocks. This is schematic only and is not intended to define a strict division between different logic elements of such entities. Each functional block may be provided in any suitable manner. It is to be understood that intermediate values described herein as being formed by a data processing system need not be physically generated by the data processing system at any point and may merely represent logical values which conveniently describe the processing performed by the data processing system between its input and output.

The data processing systems described herein may be embodied in hardware on an integrated circuit. The data processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a data processing system configured to perform any of the methods described herein, or to manufacture a data processing system comprising any apparatus described herein. An integrated circuit definition dataset may be, for example, an integrated circuit description.

Therefore, there may be provided a method of manufacturing, at an integrated circuit manufacturing system, a data processing system as described herein. Furthermore, there may be provided an integrated circuit definition dataset that, when processed in an integrated circuit manufacturing system, causes the method of manufacturing a data processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing system will now be described with respect to FIG. 13.

Figure 13:
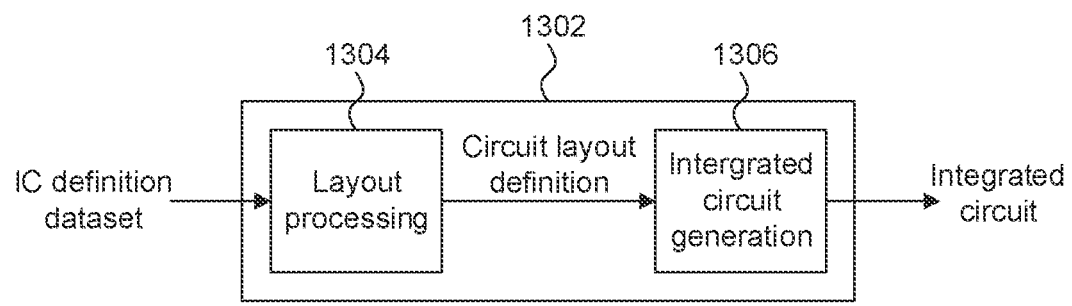
FIG. 13 shows an integrated circuit manufacturing system for generating an integrated circuit embodying a graphics processing system.

FIG. 13 shows an example of an integrated circuit (IC) manufacturing system 1302 which is configured to manufacture a data processing system as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining a data processing system as described in any of the examples herein), process the IC definition dataset, and generate an IC according to the IC definition dataset (e.g. which embodies a data processing system as described in any of the examples herein). The processing of the IC definition dataset configures the IC manufacturing system 1302 to manufacture an integrated circuit embodying a data processing system as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a data processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer implemented method of training a neural network configured to combine a set of coefficients with respective input data values, the method comprising:
    so as to train a test implementation of the neural network:
        applying sparsity,
        wherein applying sparsity comprises:
            dividing the set of coefficients into multiple groups of coefficients, wherein
            each group comprises a plurality of coefficients of the set of coefficients;
            representing each group of coefficients of the multiple groups of coefficients by a respective single value;
            modelling those values using a differentiable function representative of an extreme value distribution so as to identify a threshold value in dependence on a sparsity parameter, wherein the sparsity parameter indicates a level of sparsity to be applied to the set of coefficients; and
            applying sparsity to a plurality of groups of coefficients of the multiple groups of coefficients in dependence on that threshold value, wherein applying sparsity to each group of coefficients of the plurality of groups of coefficients comprises setting each of the coefficients in that group to zero;
        operating the test implementation of the neural network on training input data using the coefficients so as to form training output data;
        in dependence on the training output data, assessing the accuracy of the neural network; and
        updating the sparsity parameter in dependence on the accuracy of the neural network by modifying the threshold value by backpropagating one or more gradient vectors using the differentiable function; and
    configuring a runtime implementation of the neural network in dependence on the updated sparsity parameter that, when implemented at a data processing system, executes the runtime implementation of neural network in dependence on the updated sparsity parameter.

2. The computer implemented method of claim 1, wherein the extreme value distribution is a Gumbel distribution, a Weibull distribution or a Frechet distribution.

3. The computer implemented method of claim 1, wherein representing each group of coefficients by a respective single value comprises representing each group of coefficients by the respective maximum coefficient value within each group, and wherein the extreme value distribution is a Gumbel distribution.

4. The computer implemented method of claim 1, the method further comprising iteratively performing the applying, operating, assessing and updating steps so as to train a test implementation of the neural network.

5. The computer implemented method of claim 4, the method further comprising iteratively updating the set of coefficients in dependence on the accuracy of the neural network.

6. The computer implemented method of claim 4, wherein the sparsity parameter is updated using a gradient descent algorithm in dependence on a learning rate parameter that indicates the degree to which the sparsity parameter can be changed at each iteration of the training process.

7. The computer implemented method of claim 1, the method further comprising implementing the neural network in dependence on the updated sparsity parameter.

8. The computer implemented method of claim 1, the method further comprising updating the sparsity parameter in dependence on a parameter optimization technique configured to balance the level of sparsity to be applied to the set to coefficients as indicated by the sparsity parameter against the accuracy of the network.

9. The computer implemented method of claim 8, wherein the parameter optimization technique uses a cross-entropy loss equation that depends on the sparsity parameter and the accuracy of the neural network.

10. The computer implemented method of claim 9, wherein updating the sparsity parameter is performed further in dependence on a defined maximum level of sparsity to be indicated by the sparsity parameter, wherein the defined maximum level of sparsity is a factor in the cross-entropy loss equation.

11. The computer implemented method of claim 1, wherein updating the sparsity parameter is performed further in dependence on a weighting value configured to bias the test implementation of the neural network towards maintaining the accuracy of the network or increasing the level of sparsity applied to the set to coefficients as indicated by the sparsity parameter.

12. The computer implemented method of claim 11, wherein the weighting value is set in dependence on the memory and/or processing resources available on the data processing system at which the runtime implementation of the neural network is to be executed.

13. The computer implemented method of claim 1, the neural network comprising a plurality of layers, each layer configured to combine a respective set of coefficients with respective input data values to that layer so as to form an output for that layer.

14. The computer implemented method of claim 13, the method further comprising iteratively updating a respective sparsity parameter for each layer.

15. The computer implemented method of claim 13, wherein the number of coefficients in the set of coefficients for each layer of the neural network is variable between layers, and wherein updating the sparsity parameter is performed further in dependence on the number of coefficients in each set of coefficients such that the test implementation of the neural network is biased towards updating the respective sparsity parameters so as to indicate a greater level of sparsity to be applied to sets of coefficients comprising a larger number of coefficients relative to sets of coefficients comprising fewer coefficients.

16. The computer implemented method of claim 1, wherein the sparsity parameter indicates a percentage of the set of coefficients to which sparsity is to be applied.

17. The computer implemented method of claim 1, wherein configuring a runtime implementation of the neural network comprises:
  applying sparsity to a plurality of groups of the coefficients according to the updated sparsity parameter;
  compressing the groups of coefficients according to a compression scheme aligned with the groups of coefficients so as to represent each group of coefficients by an integer number of one or more compressed values; and
  storing the compressed groups of coefficients in memory for subsequent use by the implemented neural network.

18. The computer implemented method of claim 17, wherein each group comprises one or more subsets of coefficients of the set of coefficients, each group comprising n coefficients and each subset comprising m coefficients, where m is greater than 1 and n is an integer multiple of m, the method further comprising:
  compressing the groups of coefficients according to the compression scheme by compressing the one or more subsets of coefficients comprised by each group so as to represent each subset of coefficients by an integer number of one or more compressed values.

19. A non-transitory computer readable storage medium having stored thereon computer readable instructions that, when executed at a computer system, cause the computer system to perform a computer implemented method of training a neural network configured to combine a set of coefficients with respective input data values, the method comprising:
  so as to train a test implementation of the neural network:
    applying sparsity,
    wherein applying sparsity comprises:
      dividing the set of coefficients into multiple groups of coefficients, wherein each group comprises a plurality of coefficients of the set of coefficients;
      representing each group of coefficients of the multiple groups of coefficients by a respective single value;
      modelling those values using a differentiable function representative of an extreme value distribution so as to identify a threshold value in dependence on a sparsity parameter, wherein the sparsity parameter indicates a level of sparsity to be applied to the set of coefficients; and
      applying sparsity to a plurality of groups of coefficients of the multiple groups of coefficients in dependence on that threshold value, wherein applying sparsity to each group of coefficients of the plurality of groups of coefficients comprises setting each of the coefficients in that group to zero;
    operating the test implementation of the neural network on training input data using the coefficients so as to form training output data;
    in dependence on the training output data, assessing the accuracy of the neural network; and
    updating the sparsity parameter in dependence on the accuracy of the neural network by modifying the threshold value by backpropagating one or more gradient vectors using the differentiable function; and
  configuring a runtime implementation of the neural network in dependence on the updated sparsity parameter that, when implemented at a data processing system, executes the runtime implementation of neural network in dependence on the updated sparsity parameter.

20. The computer implemented method of claim 1, wherein the extreme value distribution is a Gumbel distribution, and wherein the threshold value, $\tau$, is determined in dependence on the sparsity parameter, $s_j^\sigma$, in accordance with the differentiable function, $$\tau = \phi_{w_j} - \beta_{w_j} \log\left(\log\left(\frac{1}{s_j^\sigma}\right)\right),$$

where $\phi_{w_j}$ is a location parameter and $\beta_{w_j}$ is a scale parameter, the location parameter and the scale parameter being descriptive of the Gumbel distribution.

* * * * *